US012783312B2

(12) United States Patent
Ouyang et al.

(10) Patent No.: US 12,783,312 B2
(45) Date of Patent: Nov. 3, 2026

(54) TASK ASSIGNMENTS BASED ON PREDICTED IDLE POWER OF BASE BAND UNIT CLUSTERS

(71) Applicant: ASIAINFO TECHNOLOGIES (CHINA), INC., Beijing (CN)

(72) Inventors: Ye Ouyang, Beijing (CN); Aidong Yang, Beijing (CN); Jinxian Qu, Beijing (CN); Mohan Wu, Beijing (CN)

(73) Assignee: ASIAINFO TECHNOLOGIES (CHINA), INC., Beijing (CN)

( * ) Notice: Subject to any disclaimer, the term of this patent is extended or adjusted under 35 U.S.C. 154(b) by 345 days.

(21) Appl. No.: 18/732,601

(22) Filed: Jun. 3, 2024

(65) Prior Publication Data

US 2024/0320049 A1 Sep. 26, 2024

(30) Foreign Application Priority Data

Feb. 8, 2024 (CN) ........................ 202410177101.X

(51) Int. Cl.
*G06F 9/50* (2006.01)
*G06F 9/38* (2018.01)

(52) U.S. Cl.
CPC .......... *G06F 9/5027* (2013.01); *G06F 9/3891* (2013.01); *G06F 9/505* (2013.01); *G06F 2209/5019* (2013.01)

(58) Field of Classification Search
CPC ................. G06F 9/5027; G06F 9/3891; G06F 2209/5019; G06F 9/505
See application file for complete search history.

(56) References Cited

U.S. PATENT DOCUMENTS 6,519,449 B1 * 2/2003 Zhang ................. H04W 52/367 370/347
2009/0204826 A1 * 8/2009 Cox ...................... G06F 1/3203 713/320

(Continued)

FOREIGN PATENT DOCUMENTS

CN 115243293 A 10/2022
CN 115293358 A 11/2022

(Continued)

OTHER PUBLICATIONS

Office Action and search report issued in the Chinese Patent Application No. 202410177101.X, mailed Mar. 22, 2024, with machine English translation.

*Primary Examiner* — Benjamin C Wu
(74) *Attorney, Agent, or Firm* — Ladas & Parry, LLP

(57) ABSTRACT

Embodiments of the present disclosure provide an artificial intelligence-based data processing method and apparatus, and relate to the technical field of a computing power network. The method includes: in response to at least one task request for a target application, acquiring at least one task respectively corresponding to the at least one task request; determining a second cluster respectively corresponding to each task from at least one first cluster corresponding to the target application, based on task information respectively corresponding to each task; and for each task, allocating the task to the second cluster corresponding to the task so that the second cluster performs the task based on a calculation computing power resource.

15 Claims, 7 Drawing Sheets

(56) References Cited

U.S. PATENT DOCUMENTS

| | | | | |
|---|---|---|---|---|
| 2009/0265568 | A1* | 10/2009 | Jackson | G06F 1/3203 713/320 |
| 2013/0077502 | A1* | 3/2013 | Gainey | H04B 7/15578 370/252 |
| 2014/0075222 | A1* | 3/2014 | Jackson | G06F 1/329 713/320 |
| 2014/0298349 | A1* | 10/2014 | Jackson | G06F 1/3206 718/104 |
| 2017/0093639 | A1* | 3/2017 | Dabbagh | H04L 41/0895 |
| 2018/0364795 | A1* | 12/2018 | Li | G06F 1/3296 |
| 2018/0373287 | A1* | 12/2018 | Al-Rawi | G06F 9/505 |
| 2019/0250949 | A1* | 8/2019 | Chen | G06F 9/505 |
| 2020/0104184 | A1* | 4/2020 | Subramanian | G06F 11/3409 |
| 2023/0061136 | A1* | 3/2023 | Abdollahian Noghabi | G06F 9/5027 |
| 2023/0195444 | A1* | 6/2023 | Vohra | G06F 8/60 717/172 |
| 2023/0195535 | A1* | 6/2023 | Pabón | G06F 9/455 718/104 |
| 2023/0412672 | A1* | 12/2023 | Xu | H04L 47/765 |
| 2024/0176677 | A1* | 5/2024 | Youssef | G06F 9/5094 |
| 2024/0320049 | A1* | 9/2024 | Ouyang | G06F 9/505 |
| 2025/0085769 | A1* | 3/2025 | Kommula | G06F 1/3287 |
| 2025/0093393 | A1* | 3/2025 | Chaudhari | G06F 11/34 |
| 2025/0231610 | A1* | 7/2025 | Lior | G06F 1/329 |
| 2025/0307011 | A1* | 10/2025 | Xin | G06F 9/50 |

FOREIGN PATENT DOCUMENTS

| | | | |
|---|---|---|---|
| CN | 116136799 | A | 5/2023 |
| CN | 116192960 | A | 5/2023 |
| WO | 2023164208 | A1 | 8/2023 |

* cited by examiner

TASK ASSIGNMENTS BASED ON PREDICTED IDLE POWER OF BASE BAND UNIT CLUSTERS

CROSS-REFERENCE TO RELATED APPLICATION

This application is based on and claims priority to Chinese Patent Application No. 202410177101.X, filed on Feb. 8, 2024, in the China National Intellectual Property Administration, the disclosure of which is incorporated by reference herein in its entirety.

TECHNICAL FIELD

The present disclosure relates to the technical field of a computing power network (CPN), and in particular to an artificial intelligence-based data processing method, an electronic device and a computer-readable storage medium.

BACKGROUND

The computing power network is a key part of an intelligent, comprehensive, and new type of information infrastructure that enables the transition from information exchange centered on networks to information data processing centered on computing power. At present, due to the separation of network and computing power construction, there are issues of "low efficiency and high cost" in the supply of computing power, which makes it difficult to meet the development requirements of novel digital economy.

Therefore, the construction of a unified digital infrastructure that integrates computing power and networking has emerged. In the prior art, this is achieved by adding independent computing power cards or dedicated computing servers to network equipments. However, these technologies require the additional purchase of computing power cards or computing servers, which makes the construction cost of the computing power network relatively high.

SUMMARY

Note that the concept and embodiments of the present disclosure will be described with respect to computing power network (CPN) which is a type of network that realizes optimized resource allocation, by distributing computing, storage, network and other resource information of service nodes through a network control plane (such as a centralized controller, distributed routing protocol, etc.). Such computing power network can be any kind of know and to-be-known network which may have equivalent functionalities, regardless of the expression or abbreviations of such a network, for example, Computing Aware Networking (CAN) in ITU-TD835, which is in the scope of cloud computing and is the enhancement of network of cloud computing to support the integration of cloud and network resources, Computing First Network (CFN) in IETF which leverages both computing and networking status to help determine the optimal edge among multiple edge sites with different geographic locations to serve as a specific edge computing request, Computing Force Network (CFN) in TU-C1407 which aims to achieve the computing and network joint optimization based on the awareness, control and management over computing resources in the context of IMT-2020 and beyond and is required to enable the use of Al/ML related capabilities, Computing Network Convergence (CNC) in TU-TD953, which aims to achieve computing and network resource joint optimization based on the awareness, control and management over network and computing resources, computing network, and Coordination of computing and networking (CCN) and so on. And the scope of the present application will not affected/influenced by the expression/abbreviation of the network in which the solution of the present disclosure is implemented.

Embodiments of the present disclosure provide an artificial intelligence-based data processing method, an electronic device and a computer-readable storage medium, which can solve the problem of high construction cost of a computing power network in the prior art.

The technical solutions are as follows:

According to one aspect of the embodiments of the present disclosure, an artificial intelligence-based data processing method is provided. The method includes:

in response to at least one task request for a target application, acquiring at least one task respectively corresponding to the at least one task request;

determining a second cluster respectively corresponding to each task from at least one first cluster corresponding to the target application, based on task information respectively corresponding to each task, wherein the second cluster is a cluster matched with task information of the task; and for each task, allocating the task to the second cluster corresponding to the task so that the second cluster performs the task based on a calculation computing power resource, wherein the first clusters are determined based on the following operations:

acquiring predicted idle computing power respectively corresponding to at least one base band unit (BBU) during task execution time, and determining the calculation computing power resource corresponding to the predicted idle computing power from candidate computing power resources;

clustering each BBU based on predicted idle computing power respectively corresponding to each BBU to obtain at least one cluster;

acquiring at least one application to be processed, wherein the at least one application includes the target application; and determining at least one first cluster respectively corresponding to each application from the at least one cluster, based on a computing power requirement respectively corresponding to each application, wherein the first clusters are clusters matched with the computing power requirement of the application.

Optionally, the determining at least one first cluster respectively corresponding to each application from the at least one cluster, based on a computing power requirement respectively corresponding to each application includes:

determining the computing power requirement respectively corresponding to each application and a cluster feature respectively corresponding to each cluster, wherein the cluster feature is used to represent the computing power resource supply level of the cluster;

determining a first mapping relationship between each application and each cluster, based on the computing power requirement respectively corresponding to each application and the cluster feature respectively corresponding to each cluster; and determining at least one first cluster respectively corresponding to each application based on the first mapping relationship.

Optionally, the determining a first mapping relationship between each application and each cluster, based on the computing power requirement respectively corresponding to each application and the cluster feature respectively corresponding to each cluster includes:

inputting the computing power requirement respectively corresponding to each application and the cluster feature respectively corresponding to each cluster to an orchestration model to obtain a plurality of candidate orchestration policies output by the orchestration model;

determining a target orchestration policy from the plurality of candidate orchestration policies based on a first policy evaluation index; and determining the first mapping relationship based on the target orchestration policy.

Optionally, the determining a second cluster respectively corresponding to each task from at least one first cluster corresponding to the target application, based on task information respectively corresponding to each task includes:

inputting the task information respectively corresponding to each task and each of the first clusters to a scheduling model to obtain a plurality of candidate scheduling policies output by the scheduling model;

determining a target scheduling policy from the plurality of candidate scheduling policies based on a second policy evaluation index; and determining the second cluster respectively corresponding to each task based on the target scheduling policy.

Optionally, the acquiring predicted idle computing power respectively corresponding to at least one base band unit (BBU) during task execution time includes:

for each BBU, acquiring a predicted use amount of computing power resource for communication services of the BBU during the task execution time; and determining the predicted idle computing power of the BBU during the task execution time, based on the predicted use amount of computing power resource for communication services of the BBU, a resource constraint corresponding to the BBU and a scaling-out threshold.

Optionally, the scaling-out threshold is determined based on the following operations:

determining an initial scaling-out threshold; and performing at least one optimizing operation on the initial scaling-out threshold until a preset ending condition is met, and taking the initial scaling-out threshold meeting the preset ending condition as the scaling-out threshold, wherein the optimizing operations include:

for each BBU, acquiring the current status information of computing power resource for communication services and the historical status information of computing power resource for communication services of the BBU;

determining a first predicted use amount of computing power resource for communication services in a preset time domain, based on the current status of computing power resource for communication services and the historical status of computing power resource for communication services;

for any preset time in the preset time domain, determining a second predicted use amount of computing power resource for communication services at the preset time from the first predicted use amount of computing power resource for communication services;

obtaining predicted idle computing power of the BBU at the preset time, based on the second predicted use amount of computing power resource for communication services, the resource constraint corresponding to the BBU and the initial scaling-out threshold;

determining a predicted error, based on a difference between predicted idle computing power at each preset time and actual idle computing power at each preset time in the preset time domain; and in a case that the predicted error does not meet the preset ending condition, modifying the initial scaling-out threshold and taking the modified initial scaling-out threshold as an initial scaling-out threshold for a next optimization.

Optionally, the target application includes a Federated Learning application; and a corresponding initial local model is respectively deployed by each BBU in the second cluster; and the second cluster performing a task includes:

performing at least one training operation on an initial aggregation model in the Mobile-Edge Computing (MEC) server until a training ending condition is met, and taking the initial aggregation model meeting the training ending condition as a trained aggregation model, wherein the training operations include:

acquiring the initial local model deployed by each BBU in the second cluster;

performing model aggregation on a plurality of initial local models to obtain a first aggregation model, and updating the initial aggregation model based on the first aggregation model; and in a case that a loss function of the updated initial aggregation model does not meet the training ending condition, sending the updated initial aggregation model to each BBU in the second cluster respectively so that each BBU takes the updated initial aggregation model as an initial local model for a next training operation.

According to another aspect of the embodiments of the present disclosure, an electronic device is provided. The electronic device includes a memory, and a processor, the memory is configured to store computer programs which, when executed by the processor, are configured to the following operations:

in response to at least one task request for a target application, acquiring at least one task respectively corresponding to the at least one task request;

determining a second cluster respectively corresponding to each task from at least one first cluster corresponding to the target application, based on task information respectively corresponding to each task, wherein the second cluster is a cluster matched with task information of the task; and for each task, allocating the task to the second cluster corresponding to the task so that the second cluster performs the task based on a calculation computing power resource, wherein the first clusters are determined based on the following operations:

acquiring predicted idle computing power respectively corresponding to at least one base band unit (BBU) during task execution time, and determining the calculation computing power resource corresponding to the predicted idle computing power from candidate computing power resources;

clustering each BBU based on predicted idle computing power respectively corresponding to each BBU to obtain at least one cluster;

acquiring at least one application to be processed, wherein the at least one application includes the target application; and determining at least one first cluster respectively corresponding to each application from the at least one cluster, based on a computing power requirement respectively corresponding to each application, wherein the first clusters are clusters matched with the computing power requirement of the application.

Optionally, the determining at least one first cluster respectively corresponding to each application from the at least one cluster, based on a computing power requirement respectively corresponding to each application includes:

determining the computing power requirement respectively corresponding to each application and a cluster feature respectively corresponding to each cluster, wherein the cluster feature is used to represent the computing power resource supply level of the cluster;

determining a first mapping relationship between each application and each cluster, based on the computing power requirement respectively corresponding to each application and the cluster feature respectively corresponding to each cluster; and determining at least one first cluster respectively corresponding to each application based on the first mapping relationship.

Optionally, the determining a first mapping relationship between each application and each cluster, based on the computing power requirement respectively corresponding to each application and the cluster feature respectively corresponding to each cluster includes:

inputting the computing power requirement respectively corresponding to each application and the cluster feature respectively corresponding to each cluster to an orchestration model to obtain a plurality of candidate orchestration policies output by the orchestration model;

determining a target orchestration policy from the plurality of candidate orchestration policies based on a first policy evaluation index; and determining the first mapping relationship based on the target orchestration policy.

Optionally, the determining a second cluster respectively corresponding to each task from at least one first cluster corresponding to the target application, based on task information respectively corresponding to each task includes:

inputting the task information respectively corresponding to each task and each of the first clusters to a scheduling model to obtain a plurality of candidate scheduling policies output by the scheduling model;

determining a target scheduling policy from the plurality of candidate scheduling policies based on a second policy evaluation index; and determining the second cluster respectively corresponding to each task based on the target scheduling policy.

Optionally, the acquiring predicted idle computing power respectively corresponding to at least one base band unit (BBU) during task execution time includes:

for each BBU, acquiring a predicted use amount of computing power resource for communication services of the BBU during the task execution time; and determining the predicted idle computing power of the BBU during the task execution time, based on the predicted use amount of computing power resource for communication services of the BBU, a resource constraint corresponding to the BBU and a scaling-out threshold.

Optionally, the scaling-out threshold is determined based on the following operations:

determining an initial scaling-out threshold; and performing at least one optimizing operation on the initial scaling-out threshold until a preset ending condition is met, and taking the initial scaling-out threshold meeting the preset ending condition as the scaling-out threshold, wherein the optimizing operations include:

for each BBU, acquiring a current status of computing power resource for communication services and a historical of computing power resource for communication services of the BBU;

determining a first predicted use amount of computing power resource for communication services in a preset time domain, based on the current status of computing power resource for communication services and the historical status of computing power resource for communication services;

for any preset time in the preset time domain, determining a second predicted use amount of computing power resource for communication services at the preset time from the first predicted use amount of computing power resource for communication services;

obtaining predicted idle computing power of the BBU at the preset time, based on the second predicted use amount of computing power resource for communication services, the resource constraint corresponding to the BBU and the initial scaling-out threshold;

determining a predicted error, based on a difference between predicted idle computing power at each preset time and actual idle computing power at each preset time in the preset time domain; and in a case that the predicted error does not meet the preset ending condition, modifying the initial scaling-out threshold and taking the modified initial scaling-out threshold as an initial scaling-out threshold for a next optimization.

Optionally, the target application includes a Federated Learning application; and a corresponding initial local model is respectively deployed by each BBU in the second cluster; and the second cluster performing a task includes:

performing at least one training operation on an initial aggregation model in the MEC server until a training ending condition is met, and taking the initial aggregation model meeting the training ending condition as a trained aggregation model, wherein the training operations include:

acquiring the initial local model deployed by each BBU in the second cluster;

performing model aggregation on a plurality of initial local models to obtain a first aggregation model, and updating the initial aggregation model based on the first aggregation model; and in a case that a loss function of the updated initial aggregation model does not meet the training ending condition, sending the updated initial aggregation model to each BBU in the second cluster respectively so that each BBU takes the updated initial aggregation model as an initial local model for a next training operation.

According to yet another aspect of the embodiments of the present disclosure, a computer-readable storage medium is provided. The computer-readable storage medium stores computer programs. The computer programs implement the steps of the artificial intelligence-based data processing method when being executed by the processor.

The beneficial effects brought by the technical solutions provided by embodiments of the present disclosure are as follows:

in an application deployment stage, the predicted idle computing power respectively corresponding to at least one BBU during task execution time is obtained, each BBU is clustered based on the corresponding predicted idle computing power of each BBU to obtain at least one cluster, and at least one first cluster respectively corresponding to each application is determined based on the computing power requirement respectively corresponding to each application, so that each application is allocated to a cluster which is matched with computing power requirement, idle computing power for the network device in the computing power network is utilized sufficiently, reasonable allocation of idle computing power in the computing power network is achieved, and the utilization of the computing power resources in computing power network is improved.

In a task execution stage, by acquiring at least one task of a target application, a second cluster matched with task information of each task is determined from the at least one first cluster based on the task information respectively corresponding to each task, so that the second cluster performs the task based on the calculation computing power resource, an additional hardware device is not required, and computing power support is provided for the computing application by decoupling the idle computing power of a large number of BBUs from the communication service, and flexible and low-cost computing power supply is realized.

Further, the second cluster matched with the task information of each task is determined based on the task information respectively corresponding to each task, so that different tasks can be allocated reasonably between clusters, the computing efficiency of each task is improved, and efficient computing service can be provided.

BRIEF DESCRIPTION OF DRAWINGS

To more clearly describe the technical solutions in the embodiments of the present disclosure, the accompanying drawings required for use in the description of the embodiments will be briefly described below.

DETAILED DESCRIPTION OF EMBODIMENTS

The embodiments of the present disclosure will be described below in combination with the drawings of the present disclosure. It should be understood that the following embodiments described in combination with the drawings are exemplary descriptions to explain the technical solutions of the embodiments of the present disclosure, and do not constitute a limitation to the technical solutions of the embodiments of the present disclosure.

Those skilled in the art can understand that the singular forms such as "a", "an" and "the" used herein may also include the plural forms unless otherwise stated. It should be further understood that the terms "including" and "comprising" used in the embodiments of the present disclosure mean that corresponding features may be implemented as the presented features, information, data, steps, operations, elements and/or components, but they do not exclude to be implemented as other features, information, data, steps, operations, elements, components and/or the combinations thereof supported by the technical field. It should be understood that when referred to as being "connected" or "coupled" to another element, an element may be directly connected or coupled to another element, or may be connected to another element through an intermediate element. In addition, "connected" or "coupled" used herein may include wireless connection or wireless coupling. The term "and/or" used here refers to at least one of the items defined by the term, for example, "A and/or B" may be implemented as "A", implemented as "B", or implemented as "A and B".

To clarify the objective, technical solutions and advantages of the present disclosure, the embodiments of the present disclosure will be further described in detail below in conjunction with the accompanying drawings.

The technical solutions of the embodiments of the present disclosure and the technical effects generated by the technical solutions of the present disclosure are described below through the description of several exemplary embodiments. It is to be noted that the following implementations may refer to or learn from each other or be combined with each other, and the same terms, similar features and similar implementation steps in different implementations will not be repeated.

Figure 1:
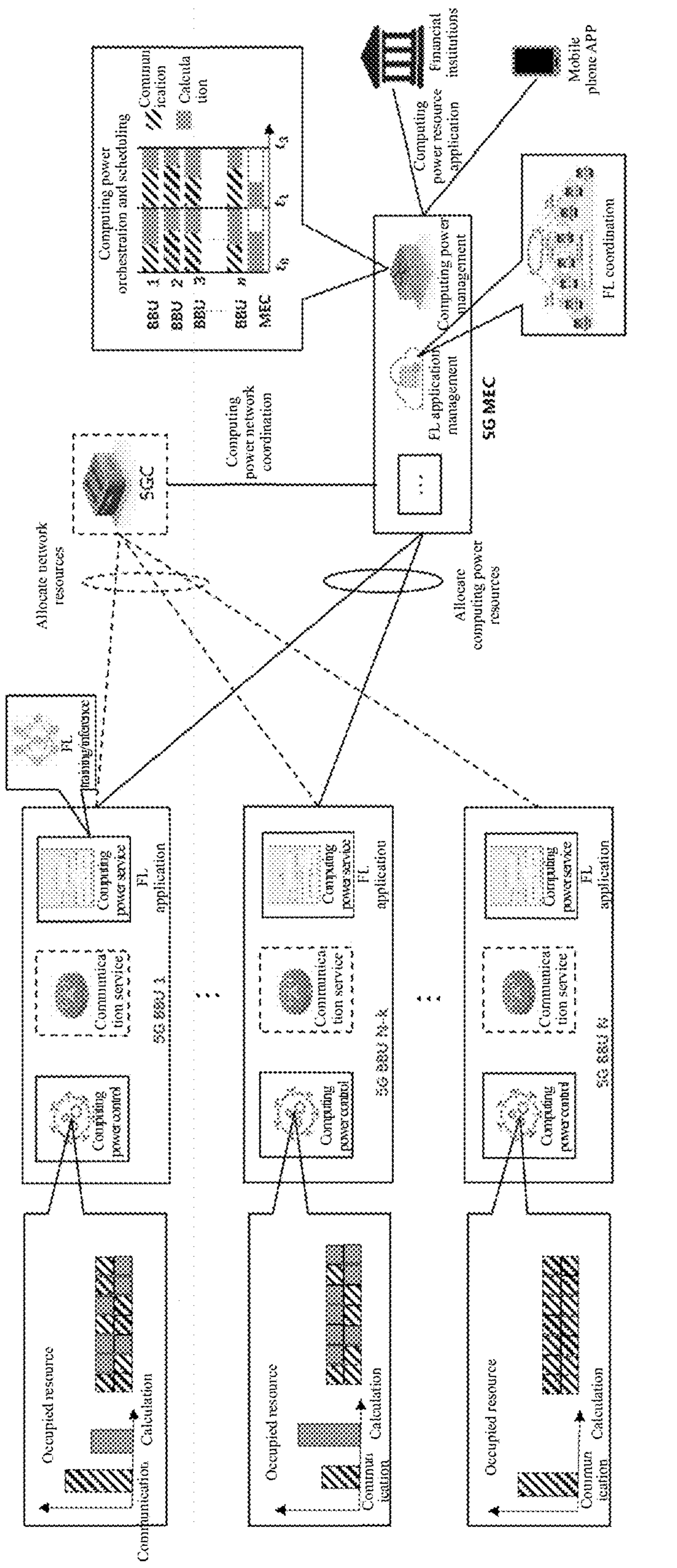
FIG. 1 is a system architecture diagram of a computing power network according to an embodiment of the present disclosure.

FIG. 1 is a system architecture diagram of a computing power network according to an embodiment of the present disclosure. As shown in FIG. 1, embodiments of the present disclosure are based on a 5G standalone (SA) system architecture of 3rd generation partnership project (3GPP)

standard, including N 5G base band units (BBUs), a 5G mobile edge computing (MEC) and a 5th generation core network (5GC).

The 5G BBU separates idle computing power from computing power of a communication service through a virtualizer by virtue of a hypervisor technology, so that an idle computing power resource can be provided for various application services, for example, a Federated Learning (FL) application and a face recognition application; in addition, a 3GPP 5G radio access network (RAN) network service is further provided.

As shown in FIG. 1, each BBU may include a certain amount of computing power resource, and one square on the left side of FIG. 1 represents a unit of computing power resource. Taking a central processing unit (CPU) as an example, one square represents one CPU, where a square filled with shade represents a computing power resource for the communication service, and a square filled with gray represents a computing power resource for computing, that is, idle computing power. In the example shown in FIG. 1, the 5G BBUs (hereinafter simply referred to as BBU) 1-N include 14 CPUs, and the above example does not constitute a limitation to the number of the CPUs in the BBU. In a case that 8 CPUs in BBU1 in FIG. 1 are used for communication, 6 CPUs may be used computing; in a case that 6 CPUs in BBU2 are used for communication, 8 CPUs may be used for computing; and all the CPUs in the BBU N are used for communication. It should be noted that all the BBUs and the MEC are physically connected, but the BBU N does not have idle computing power for computing. No computing power resource is allocated to the BBU N here, which is equivalent to “no connection” between the BBU N and the 5G MEC.

The 5G MEC performs idle computing power resource orchestration and task scheduling, and various application management capabilities, such as FL coordination; and the 5GC may provide a basic network service and a network computing power coordination service.

It should be noted that the embodiment of the present disclosure is described by a 5th generation mobile communication technology (5G) computing power network system, those skilled in the art may know that in other application scenarios, it may also be suitable for other mobile communication network systems, for example, a future network, that is, a new generation of network, for example, a beyond 5G (B5G) or 6th generation mobile communication technology (6G) network.

Figure 2:
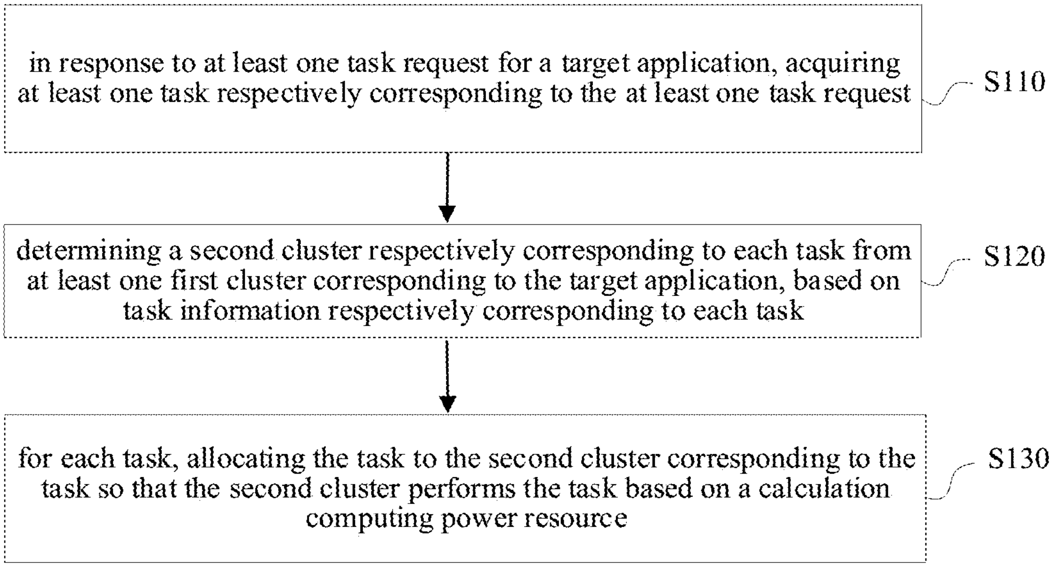
FIG. 2 is a schematic flowchart of an artificial intelligence-based data processing method according to an embodiment of the present disclosure.

FIG. 2 is a schematic flowchart of an artificial intelligence-based data processing method according to an embodiment of the present disclosure. As shown in FIG. 2, the method includes:

Step S110: in response to at least one task request for a target application, at least one task respectively corresponding to the at least one task request is acquired.

Specifically, the computing power network system may include one MEC server and a plurality of BBUs. The artificial intelligence-based data processing method provided by the embodiment of the present disclosure may be performed by the MEC server, the plurality of BBUs, or a combination of the MEC server and the plurality of BBUs in the computing power network system.

The main function of the computing power network system is to realize mobile communication, but in addition to including the computing power for the communication service, the network device (for example, the BBU) may include extra idle computing power, which may also be referred to as native computing (NC).

For example, one BBU may include the computing power resources of 10 CPUs, where when 6 CPUs provide the computing power for the communication service, the computing power resources of the remaining 4 CPUs are idle. To fully utilize the idle computing power of the network device, a plurality of applications may be pre-deployed on a plurality of network devices by orchestration of the computing power resources, and the method for orchestration of the computing power resources will be described below in detail.

After the application deployment is completed, the MEC server may receive at least one task request for the target application, and acquire at least one task respectively corresponding to the at least one task request.

The target application may be any application of a plurality of applications deployed on a plurality of BBUs. For example, the target application may be an FL application, a face recognition application and the like. The target application may be specifically set according to the actual application scenario, which is not limited by the embodiment of the present disclosure.

Step S120: a second cluster respectively corresponding to each task is determined from at least one first cluster corresponding to the target application, based on task information respectively corresponding to each task, where the second cluster is a cluster matched with the task information of the task.

Specifically, when a plurality of task requests for the target application are received, it is necessary to schedule a plurality of tasks respectively corresponding to the plurality of task requests.

After at least one task respectively corresponding to at least one task request is obtained, the task information respectively corresponding to each task may be determined, where the task information may be information related to the task, and the task information may include a task requirement, conditions related to task restriction and the like.

The second cluster respectively corresponding to each task is determined from at least one first cluster based on the task information respectively corresponding to each task, where the second cluster may be a cluster matched with the task information of the task, and the second cluster may be configured to perform a corresponding task; and the first clusters may be clusters corresponding to the target application, and the target application may correspond to at least one first cluster.

The first clusters are determined based on the following operations:

(1) acquiring predicted idle computing power respectively corresponding to at least one BBU during task execution time, and determining the calculation computing power resource corresponding to the predicted idle computing power from candidate computing power resources;

(2) clustering each BBU based on predicted idle computing power respectively corresponding to each BBU to obtain at least one cluster;

(3) acquiring at least one application to be processed, where the at least one application includes the target application; and (4) determining at least one first cluster respectively corresponding to each application from at least one cluster, based on the computing power requirement respectively corresponding to each application, where the first clusters are clusters matched with the computing power requirement of the application.

Specifically, before Step S110 is performed, the MEC server may predict the predicted idle computing power of at least one BBU during the task execution time, where the task execution time may be execution time of a task corresponding to the target application, and a method for acquiring the predicted idle computing power will be described below in detail.

The calculation computing power resource corresponding to the predicted idle computing power is determined from the candidate computing power resource based on the predicted idle computing power, the calculation computing power resource and the computing power resource for communication services are separated by a hypervisor technology, so that the calculation computing power resource is used to process the application service, and the computing power resource for communication services is used to process the communication service. The calculation computing power resource and the computing power resource for communication services are separated, so that a stable computing power service can be provided by the calculation computing power resource.

After the predicted idle computing power respectively corresponding to each BBU is obtained, clustering may be performed on each BBU by computing power according to the predicted idle computing power respectively corresponding to each BBU, that is, the plurality of BBUs with similar idle computing power are classified into one category, that is, one computing power cluster. A plurality of computing power clusters is obtained by traversing all BBU devices.

One cluster includes at least one BBU, and clustering may be performed based on a grouping method, a K-means, a K-medoids clustering algorithm. The specific method for BBU clustering is not limited by the present disclosure.

By clustering the plurality of BBUs based on the predicted idle computing power respectively corresponding to each BBU, the plurality of BBUs with the similar predicted idle computing power are divided into a cluster, so that the computing powers of the plurality of BBUs in one cluster are more proximate, the "buckets effect" in resource allocation is avoided, which is beneficial to improvement of the balance of the subsequent resource allocation and the computing efficiency.

At least one application to be processed may be acquired after BBUs are clustered. The at least one application may be an application that is required to be processed by the idle computing power of the plurality of BBUs. The at least one application may include the target application.

For each application, the computing power requirement respectively corresponding to each application may be determined, the computing power resources are orchestrated based on the computing power requirement respectively corresponding to each application, and at least one first cluster respectively corresponding to each application is determined from at least one cluster obtained through clustering, where the first cluster may be clusters matched with the computing power requirements of the application. The specific orchestration method for the computing power resources will be described below in detail.

Step S130: for each task, the task is allocated to a second cluster corresponding to the task so that the second cluster performs the task based on the calculation computing power resource.

Specifically, after task scheduling is completed, for each task, the task may be allocated to the second cluster corresponding to the task, and the second cluster may perform the task by using the calculation computing power resource in the second cluster.

In the embodiment of the present disclosure, in an application deployment stage, the predicted idle computing power respectively corresponding to at least one BBU during task execution time is obtained, each BBU is clustered based on the corresponding predicted idle computing power of each BBU to obtain at least one cluster, and at least one first cluster respectively corresponding to each application is determined based on the computing power requirement respectively corresponding to each application, so that each application is allocated to a cluster which is matched with computing power requirement, idle computing power for the network device in the computing power network is utilized sufficiently, reasonable allocation of idle computing power in the computing power network is achieved, and the utilization of the computing power resources in computing power network is improved.

In a task execution stage, by acquiring at least one task of a target application, a second cluster matched with task information of each task is determined from the at least one first cluster based on the task information respectively corresponding to each task, so that the second cluster performs the task based on the calculation computing power resource, an additional hardware device is not required, and computing power support is provided for the computing application by decoupling the idle computing power of a large number of BBUs from the communication service, and flexible and low-cost computing power supply is realized.

Further, the second cluster matched with the task information of each task is determined based on the task information respectively corresponding to each task, so that different tasks can be allocated reasonably between clusters, the computing efficiency of each task is improved, and efficient computing service can be provided.

Figure 3:
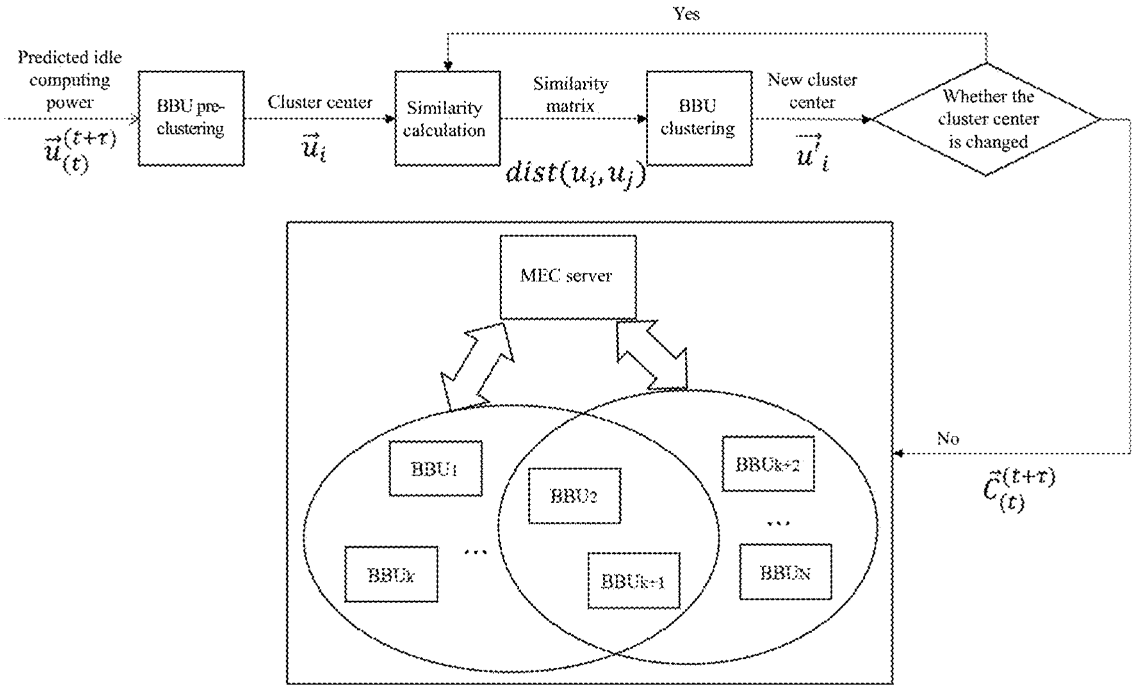
FIG. 3 is a schematic flowchart of BBU clustering according to an embodiment of the present disclosure.

As an optional embodiment, FIG. 3 is a schematic flowchart of BBU clustering according to an embodiment of the present disclosure. As shown in FIG. 3, the process of clustering each BBU based on predicted idle computing power respectively corresponding to each BBU to obtain at least one cluster includes:

(1) the plurality of BBUs is pre-clustered based on the predicted idle computing power resources $$\vec{u}_{(t)}^{(t+\tau)}$$

respectively corresponding to the plurality of BBUs, where pre-clustering refers to selecting a preset number of BBUs from the plurality of BBUs as a cluster center, for example, randomly selecting a preset number of BBUs as a cluster center $\vec{u}_i$ of an $i^{th}$ cluster;

(2) for each initial cluster obtained through pre-clustering, the similarity between each of the remaining BBUs in the initial cluster and the cluster center BBU is calculated to obtain a similarity matrix, for example, an Euclidean distance dist($u_i$, $u_j$) between each BBU and the cluster center BBU is calculated, where $u_j$ represents any of the remaining BBUs; and (3) each BBU is clustered with the cluster center having the maximum similarity according to the similarity, a plurality of new clusters are obtained through re-clustering, and a cluster center $\vec{u}'_i$ in each of the new clusters is calculated. In a case that the new cluster center $\vec{u}'_i$ is identical to the original cluster center, clustering ends, otherwise, returning to Step (2) to continuously calculate the similarity until convergence, and the clustering result when the clustering ends serves as the final clustering result $$\vec{C}_{(t)}^{(t+\tau)},$$

where $$\vec{C}_{(t)}^{(t+\tau)}$$

represents M clusters $$\vec{C}_{(t)}^{(t+\tau)} = \{C_1, C_2, \ldots, C_M\}$$

after the BBUs are clustered.

It should be noted that the plurality of clusters obtained through clustering are logically separated from each other, but are not necessarily physically separated from each other. That is, two clusters may include overlapping BBUs, as shown in FIG. 3, both the cluster C1 and the cluster C2 include $BBU_2$ and $BBU_{k+1}$.

As an optional embodiment, the process of determining at least one first cluster respectively corresponding to each application from at least one cluster based on the computing power requirement respectively corresponding to each application includes:

determining the computing power requirement respectively corresponding to each application and a cluster feature respectively corresponding to each cluster, where the cluster feature is used to represent the computing power resource supply level of the cluster;

determining a first mapping relationship between each application and each cluster, based on the computing power requirement respectively corresponding to each application and the cluster feature respectively corresponding to each cluster; and determining at least one first cluster respectively corresponding to each application based on the first mapping relationship.

Specifically, after a plurality of applications to be deployed are determined, the plurality of applications may be analyzed to obtain the computing power requirement respectively corresponding to each application. The computing power requirement may be used to represent the required computing power resource, for example, the number of CPU cores and the size of the memory.

A plurality of clusters is obtained after the plurality of BBUs is clustered. For each cluster, the cluster feature of the cluster may be acquired. For example, the cluster feature of the cluster may be obtained by performing feature extraction on the predicted idle computing power of the plurality of BBUs in the cluster, where the cluster feature may be used to represent the computing power resource supply level of the cluster.

The first mapping relationship between each application and each cluster may be determined based on the computing power requirement respectively corresponding to each application and the cluster feature respectively corresponding to each cluster, where the first mapping relationship may be used to reflect a matched relationship between the application and the cluster, and one application may be matched with at least one cluster.

For each application, based on the first mapping relationship, at least one cluster matched with the application may be taken as at least one first cluster corresponding to the application.

As an optional embodiment, the process of determining the first mapping relationship between each application and each cluster based on the computing power requirement respectively corresponding to each application and the cluster feature respectively corresponding to each cluster includes:

inputting the computing power requirement respectively corresponding to each application and the cluster feature respectively corresponding to each cluster to an orchestration model to obtain a plurality of candidate orchestration policies output by the orchestration model;

determining a target orchestration policy from the plurality of candidate orchestration policies based on a first policy evaluation index; and determining the first mapping relationship is determined based on the target orchestration policy.

Specifically, to match each application with each cluster, an orchestration model may be established based on an orchestration algorithm, the computing power requirement respectively corresponding to each application and the cluster feature respectively corresponding to each cluster are input into the orchestration model, and each application is respectively allocated to clusters through the orchestration model and based on the orchestration algorithm to obtain a plurality of candidate orchestration policies output by the orchestration model.

The orchestration algorithm includes but not limited to a random algorithm, and the candidate orchestration policies may include allocation modes of allocating each application to each cluster.

For each of the candidate orchestration policies, a first policy evaluation index corresponding to the candidate orchestration policy is determined. The first policy evaluation index may be used to reflect the computing performance of the candidate orchestration policy, and the first policy evaluation index may be determined based on at least one of indexes, such as computing expected time, computing cost and computing energy consumption.

Based on the first policy evaluation index respectively corresponding to each of the candidate orchestration policies, an optimal candidate orchestration policy is determined from the plurality of candidate orchestration policies, and the optimal candidate orchestration policy is taken as a target orchestration policy.

Optionally, in case that the first policy evaluation index includes at least one of computing expected time, computing cost and computing energy consumption, the candidate orchestration policy with the smallest numerical value of the first computing performance index may be taken as an optimal candidate orchestration mode.

For example, taking computing expected time as an example, $wt_{ij}$ is time of the application i running on the cluster j, and $t_{max}=\max\{wt_{ij}\}$ is the first policy evaluation index of the candidate orchestration policy. Based on this, the candidate orchestration policy with the smallest value of $t_{max}$ in the plurality of candidate orchestration policies is taken as the optimal candidate orchestration policy, that is, the target orchestration policy.

Optionally, in a case that the first policy evaluation index includes at least two of computing expected time, computing cost and computing energy consumption, taking computing expected time and computing cost as an example, in one example, filtering may be performed based on the computing expected time, and then filtering may be performed based on the computing cost. For example, a plurality of first candidate orchestration modes with the computing expected time less than a time threshold may be filtered from the plurality of candidate orchestration modes, and then the first candidate orchestration mode with the minimum computing cost is taken as an optimal candidate orchestration mode.

In another example, corresponding weights may be set respectively for the computing expected time and the computing cost, and weighted calculation may be performed based on the computing expected time and the computing cost to obtain the first computing performance index, and the candidate orchestration mode with the smallest value of the first computing performance index is taken as an optimal candidate orchestration mode.

It should be noted that the above example does not constitute a limitation to a setting method for a first policy evaluation index, and the specific setting method for the first policy evaluation index is not limited by the embodiment of the present disclosure.

After the target orchestration policy is obtained, a first mapping relationship between each application and each cluster may be determined based on the target orchestration policy.

Figure 4:
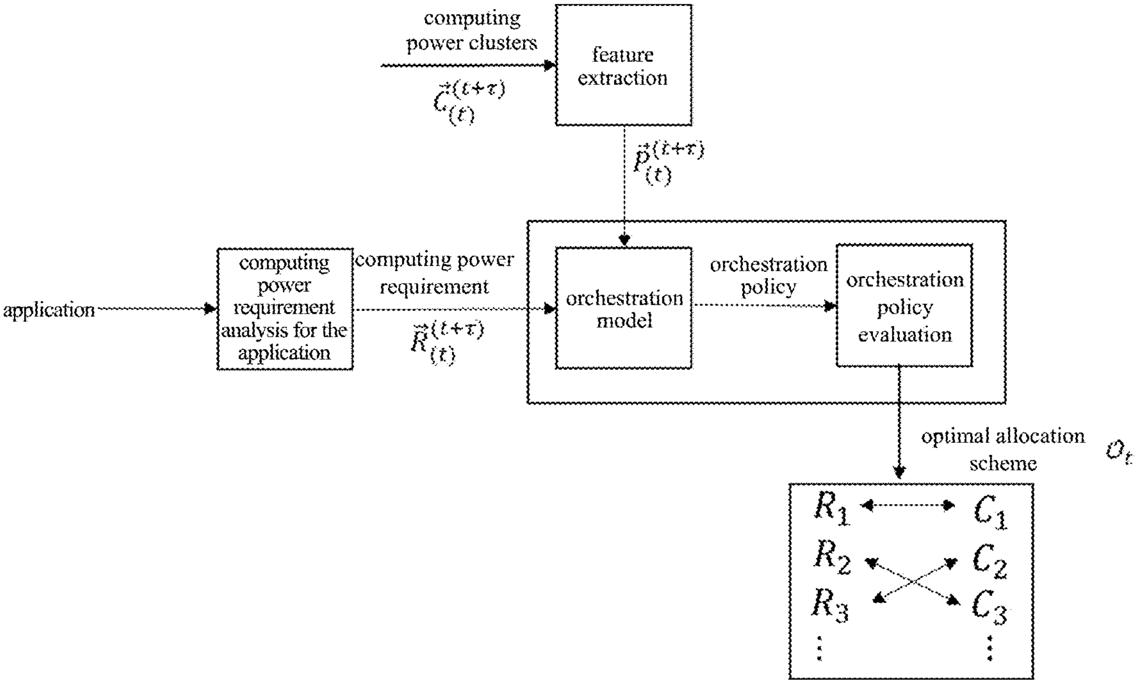
FIG. 4 is a schematic flowchart of a computing power resource orchestration process according to an embodiment of the present disclosure.

FIG. 4 is a schematic flowchart of a computing power resource orchestration process according to an embodiment of the present disclosure. As shown in FIG. 4, at a requesting side, the MEC server calculates the computing power requirement of the application, for example, the number of the required CPU cores and the size of the memory, in response to the computing power resource request from the application. At a supplying side, based on the predicted idle computing power $$\vec{u}_{(t)}^{(t+\tau)},$$

S BBUs are clustered (including but not limited to a binary splitting algorithm) as M clusters $$\vec{C}_{(t)}^{(t+\tau)}$$

through clustering by computing power, and then the feature of the cluster computing power resource is extracted as $$\vec{P}_{(t)}^{(t+\tau)}.$$

For example, $$P_i = \frac{1}{|c_i|}\sum_{c \in C_i} c,$$

where C represents a cluster, $$\vec{C}_{(t)}^{(t+\tau)}$$

represents a clustering result output by the clustering algorithm in a time interval τ starting from time t, such as $C_i$=[BBU1, BBU3, BBU4, . . . . BBU k . . . ], i=1, 2, 3 . . . . M; and P is a data feature matrix or vector of C, P=[(u11, u12, . . . ), (u31, u32, . . . ), . . . ], and (u11, u12, . . . ) here represents a predicted idle computing power feature vector of the BBU1.

The orchestration model is established based on the orchestration algorithm, and N requirements are allocated to M clusters through the orchestration model to obtain the orchestration policy. A requirement set is represented as $$\vec{R}_{(t)}^{(t+\tau)}: \{R_1, R_2, R_j \ldots, R_N\},$$

herein, $R_j$(j=1, 2, . . . , N) represents the computing power resource requirement of a $j^{th}$ application, a cluster set is {$C_1$, $C_2$, . . . , $C_M$}, a feature set corresponding thereto is represented as {$P_1$, $P_2$, . . . , $P_M$}, and there may be a plurality of clusters meeting the computing power resource requirement of one application.

The candidate orchestration policies are evaluated based on the first policy evaluation index so as to filter out the optimal orchestration policy. The first policy evaluation index is determined according to the computing expected time, the computing cost or the computing energy consumption of the application. Taking the computing expected time as an example, $wt_{ij}$ is time of the application i running on the cluster j, $t_{max}$=max{$wt_{ij}$} is the first policy evaluation index of the candidate orchestration policies, and the candidate orchestration policy with the smallest value of $t_{max}$ is the target orchestration policy $\mathcal{O}_t$. As shown in FIG. 4, the target orchestration policy $\mathcal{O}_t$ includes: $R_1$ is allocated to the cluster $C_1$, the $R_2$ is allocated to the cluster $C_3$, and the $R_3$ is allocated to the cluster $C_2$, so that the first mapping relationship between each application and each cluster can be determined based on the target orchestration policy $\mathcal{O}_t$.

In the embodiments of the present disclosure, the computing power resources of each cluster are orchestrated based on the computing power resource requirement respectively corresponding to each application, and the requesting side is efficiently matched with the supplying side, so that reasonable allocation of clusters for different computing power requirements is achieved.

As an optional embodiment, the process of determining the second cluster respectively corresponding to each task from at least one first cluster based on the task information respectively corresponding to each task includes:

inputting task information respectively corresponding to each task and each of the first clusters into a scheduling model to obtain a plurality of candidate scheduling policies output by the scheduling model;

determining a target scheduling policy is determined from the plurality of candidate scheduling policies, based on a second policy evaluation index; and determining the second cluster respectively corresponding to each task based on the target scheduling policy.

Specifically, to schedule a plurality of tasks of the target application, at least one first cluster corresponding to the target application may be determined, a scheduling model is established based on a scheduling algorithm, the task information respectively corresponding to each task and each of the first clusters respectively corresponding to the target application are input to the scheduling model, and each task is scheduled to each of the first clusters through the scheduling model based on the scheduling algorithm to obtain a plurality of candidate scheduling policies output by the scheduling model.

The scheduling algorithm includes but not limited to a first in first out (FIFO) algorithm, an ant colony algorithm and the like. The candidate scheduling policy may include a scheduling mode for scheduling each task to each of the first clusters corresponding to the target application.

For each candidate scheduling policy, a second policy evaluation index of the candidate scheduling policy is determined. The second policy evaluation index may be used to reflect the computing performance of the candidate scheduling policy. The second policy evaluation index may be determined based on at least one of indexes such as computing expected time, computing cost and computing energy consumption.

Based on the second policy evaluation index respectively corresponding to each candidate scheduling policy, an optimal candidate scheduling policy is determined from a plurality of candidate scheduling policies, and the optimal candidate scheduling policy is taken as a target scheduling policy.

It should be noted that the specific setting of the second policy evaluation index may be referenced to the setting method for the first policy evaluation index mentioned above, which is not repeated herein.

After the target scheduling policy is obtained, for each task, the first cluster to which the task is scheduled to in the target scheduling policy may be taken as a second cluster corresponding to the task.

Figure 5:
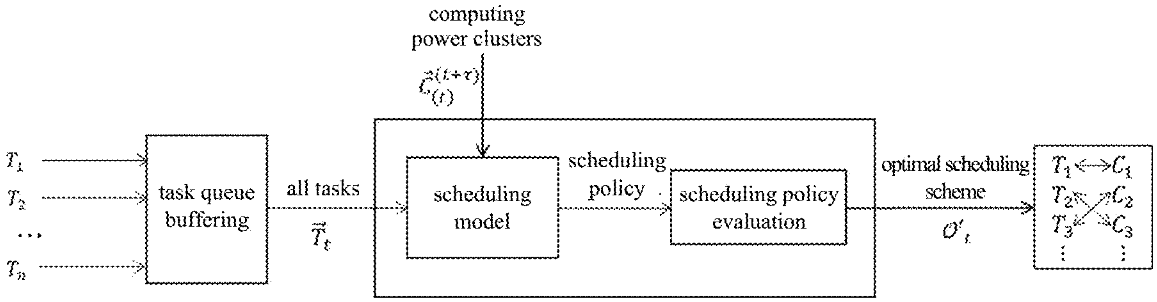
FIG. 5 is a schematic flowchart of a task scheduling process according to an embodiment of the present disclosure.

FIG. 5 is a schematic flowchart of a task scheduling process according to an embodiment of the present disclosure. As shown in FIG. 5, the task scheduling process includes:

firstly, the MEC server receives a plurality of task requests for a target application to obtain a task queue $\vec{T}_t$: $\{T_1, T_2, T_3, \ldots, T_n\}$, where $T_j$($j=1, 2, \ldots, n$) represents a $j^{th}$ task, $T_j$ may be a single task vector, the specific form of $T_j$ may be $[t_{j1}, t_{j2}, t_{j3}, \ldots]$, and $t_{ji}$ represents indexes such as a task requirement and conditions related to task restriction. For example, $t_{j1}$ represents the number of CPU cores required by the task, $t_{j2}$ represents the size of the memory required by the task, and $t_{j3}$ represents the task completion time.

A scheduling model is established based on a scheduling algorithm, n tasks in the task queue $\vec{T}_t$ are allocated by the scheduling model to be performed by m clusters corresponding to the target application to obtain a plurality of candidate scheduling policies. The clusters are represented as $\{C_1, C_2, \ldots, C_m\}$, and $C_k$ represents a $k^{th}$ cluster.

The candidate scheduling policies are evaluated based on a second policy evaluation index so as to filter out an optimal scheduling policy. The second policy evaluation index is determined according to the computing expected time, the computing cost or the computing energy consumption of the task. Taking the computing expected time as an example, $wt'_{ij}$ is time of the task i running on the cluster j, $t'_{max}=\max\{wt'_{ij}\}$ is the first policy evaluation index of the candidate orchestration policies, and the candidate scheduling policy with the smallest value of $t'_{max}$ is the target scheduling policy $$O'_t.$$

As shown in FIG. 5, the target scheduling policy $$O'_t$$

includes: $T_1$ is allocated to the cluster $C_1$, the $T_2$ is allocated to the cluster $C_3$, and the $T_3$ is allocated to the cluster $C_2$. Taking the task $T_1$ as an example, a second cluster corresponding to the task $T_1$ may be determined as $C_1$ based on the target scheduling policy $$O'_t,$$

that is, $T_1$ is allocated to $C_1$, and $T_1$ is performed through the calculation computing power resource of $C_1$.

In the embodiments of the present disclosure, each task is scheduled based on the task information respectively corresponding to each task, so that clusters can be reasonably allocated for different tasks, thereby improving the computing efficiency of each task and providing an efficient computing service.

As an optional embodiment, the process of acquiring predicted idle computing power respectively corresponding to at least one base band unit (BBU) during task execution time includes:

for each BBU, acquiring a predicted use amount of computing power resource for communication services of the BBU during the task execution time; and determining the predicted idle computing power of the BBU during the task execution time, based on the predicted use amount of computing power resource for communication services of the BBU, a resource constraint corresponding to the BBU and a scaling-out threshold.

Specifically, for each BBU, to predict the idle computing power of the BBU during the task execution time, the predicted use amount of computing power resource for communication services of the BBU during the task execution time may be acquired, where the predicted use amount of computing power resource for communication services may be a computing power resource consumed by communication during the task execution time. For example, the current utilization rate of the CPU is 30%, the use amount of the memory is 4.7 GB, and the determining approach for the predicted use amount of computing power resource for communication services will be described below in detail.

After the predicted use amount of computing power resource for communication services of the BBU is obtained, an separation threshold of the resource may be obtained through a computing power separation model based on the predicted use amount of computing power resource for communication services of the BBU, the resource constraint corresponding to the BBU and the scaling-out threshold, and the predicted idle computing power of the BBU during the task execution time may be determined after the threshold is sent to the BBU for execution. The calculation formula of the computing power separation model will be described below in detail.

Optionally, the value of the scaling-out threshold is not less than the maximum of a computing power for communication services use amount in a computing power for communication services jitter interval.

Figure 6:
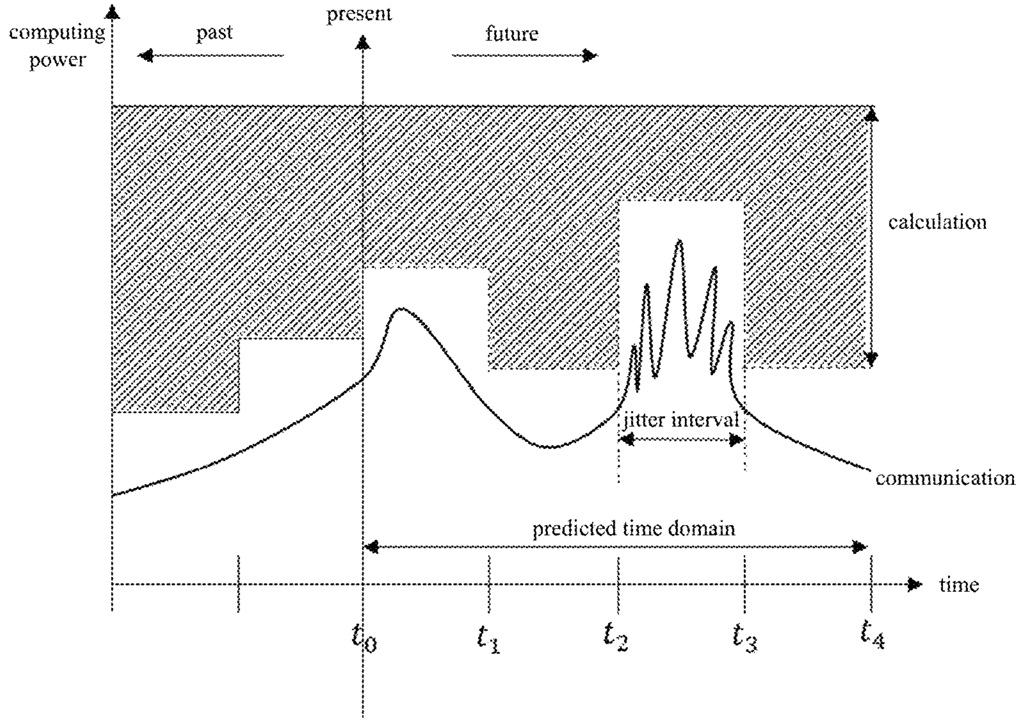
FIG. 6 is a schematic diagram of a computing power changing trend according to an embodiment of the present disclosure.

FIG. 6 is a schematic diagram of a computing power changing trend according to an embodiment of the present disclosure. As shown in FIG. 6, in FIG. 6, the horizontal axis represents time, the longitudinal axis represents the size of the computing power resource, the curve represents the changing trend of the computing power resource for communication services, and the shaded part represents the idle computing power for calculation. It can be seen from FIG. 6 that the sum of the use amount of computing power resource for communication services and the calculation of use amount of computing power resource for each BBU is unchanged. When the curve of the computing power resource for communication services jitters, it is likely that the actual use amount of computing power resource for communication services is greater than the predicted use amount of computing power resource for communication services, so that the predicted idle computing power is not necessarily all idle; and the actual available idle computing power is less than the predicted idle computing power, so that the subsequent misallocation of the idle computing power resources occurs, and part of the applications cannot be performed due to the insufficient computing power resource.

In view of the above situation, in the embodiments of the present disclosure, the calculated predicted idle computing power may always be available by setting the scaling-out threshold, so that the situation that the actual computing power resources are insufficient due to the high predicted idle computing power is avoided, and strong robustness is achieved in the scenarios of the periodic change and burr (sudden fluctuation) of the computing power resources.

As an optional embodiment, the scaling-out threshold is determined based on the following operations:

- determining an initial scaling-out threshold; and
- performing at least one optimizing operation on the initial scaling-out threshold until a preset ending condition is met, and taking the initial scaling-out threshold meeting the preset ending condition as the scaling-out threshold.

The optimizing operation includes:

- for each BBU, acquiring a current status of computing power resource for communication services and a historical status of computing power resource for communication services of the BBU;
- determining a first predicted use amount of computing power resource for communication services in a preset time domain, based on the current status of computing power resource for communication services and the historical status of computing power resource for communication services;
- for any preset time in the preset time domain, determining a second predicted use amount of computing power resource for communication services at the preset time from the first predicted use amount of computing power resource for communication services;
- obtaining predicted idle computing power of the BBU at the preset time, based on the second predicted use amount of computing power resource for communication services, the resource constraint corresponding to the BBU and the initial scaling-out threshold;
- determining a predicted error based on a difference between predicted idle computing power at each preset time and actual idle computing power at each preset time in the preset time domain; and
- in a case that the predicted error does not meet the preset ending condition, modifying the initial scaling-out threshold and taking the modified initial scaling-out threshold as an initial scaling-out threshold for a next optimization.

Specifically, to determine an optimal scaling-out threshold, an initial scaling-out threshold may be determined first, for example, the initial scaling-out threshold may be determined according to experience or historical data.

After the initial scaling-out threshold is obtained, the idle computing power may be predicted through a computing power separation model based on the initial scaling-out threshold.

For each BBU, the MEC server may acquire the current resource use amount of communication computing power $x_i(t)$ of the BBU at the current time, and the current status of computing power resource for communication services $\tilde{x}_i(t)$ is obtained by a status estimation method according to the current resource use amount of communication computing power $x_i(t)$. The status estimation method includes but not limited to maximum likelihood, maximum prior, distributed Kalman filter, distributed particle filter, covariance consistency and other estimation algorithms.

Optionally, the calculation formula of the current status of computing power resource for communication services $\tilde{x}_i(t)$ is as follows:

$$\tilde{x}_i(t) = x_i(t) + \Delta L_i(t)$$

in the formula, $x_i(t)$ represents the computing power resource for communication services use amount of $BBU_i$ at the time t, $\Delta L_i(t)$ represents the modified amount of the computing power resource for communication services used by BBU; at the time t, and $\tilde{x}_i(t)$ represents the status of computing power resource for communication services of $BBU_i$ at the time t.

After the current status of computing power resource for communication services is obtained, the predicted use amount of computing power recourse for communication services at least one time in the preset time domain may be obtained by a timing prediction algorithm based on the current status of computing power resource for communication services and the historical status of computing power resource for communication services, so that a first predicted use amount of computing power resource for communication services $\widetilde{x_i}_t^{\prime(t+\tau)}$ in the preset time domain is obtained.

The timing prediction algorithm includes but not limited to an arithmetic average, an exponential smoothing method, an autoregressive integrated moving average model (ARIMA) and the like; and the historical status of computing power resource for communication services may be acquired from a preset database.

For any preset time in the preset time domain, the predicted use amount of computing power resource for communication services at the preset time in the first predicted use amount of computing power resource for communication services is taken as a second predicted use amount of computing power resource for communication services. The predicted idle computing power of the BBU at the preset time is calculated by the computing power separation model based on the second predicted use amount of computing power resource for communication services, the resource constraint corresponding to the BBU and the initial scaling-out threshold.

Each BBU has a resource constraint R. R herein may be written in the form of a vector to represent different resources, such as CPU and memory.

In a case that the preset time domain includes K time periods, the formula of the computing power separation model of each time period $[t_k, t_{k+1}]$ is as follows:

$$u_i(t) = R_i - \max\left(\widetilde{x_i'}_{t_k}, \widetilde{x_i'}_{t_{k+1}}\right) - \beta$$

in the formula, $u_i(t)$ represents the predicted idle computing power of the $i^{th}$ BBU at the time t, $R_i$ represents the resource constraint of the $i^{th}$ BBU, β is the initial scaling-out threshold, $\widetilde{x_i}_t^{(t+\tau)}$ represents the first predicted use amount of computing power resource for communication services in the present time domain [t, t+τ], $\widetilde{x_i'}_{t_k}$ represents the second predicted use amount of computing power resource for communication services at the time $t_k$, and $\widetilde{x_i'}_{t_{k+1}}$ represents the second predicted use amount of computing power resource for communication services at the time $t_{k+1}$.

Based on the above steps, the predicted idle computing power at each preset time in the preset time domain is obtained through calculation, and a predicted error is determined based on the difference between the predicted idle computing power at each preset time and the actual idle computing power at each preset time.

In a case that the predicted error does not meet the preset ending condition, the initial scaling-out threshold is modified, the modified initial scaling-out threshold is taken as an initial scaling-out threshold for the next optimization, the optimizing operation is repeated until the preset ending condition is met, and the initial scaling-out threshold meeting the preset ending condition is taken as the scaling-out threshold for actual prediction.

The preset ending condition may include the predicted error being less than a preset error threshold.

The initial scaling-out threshold is continuously modified by continuously performing the above optimizing operation, so that the finally obtained scaling-out threshold may be adaptively adjusted according to the change of the computing power for communication services and is as close as possible to the maximum of the computing power for communication services use amount in the computing power for communication services jitter interval, where the computing power for communication services jitter interval is shown in FIG. 6.

Figure 7:
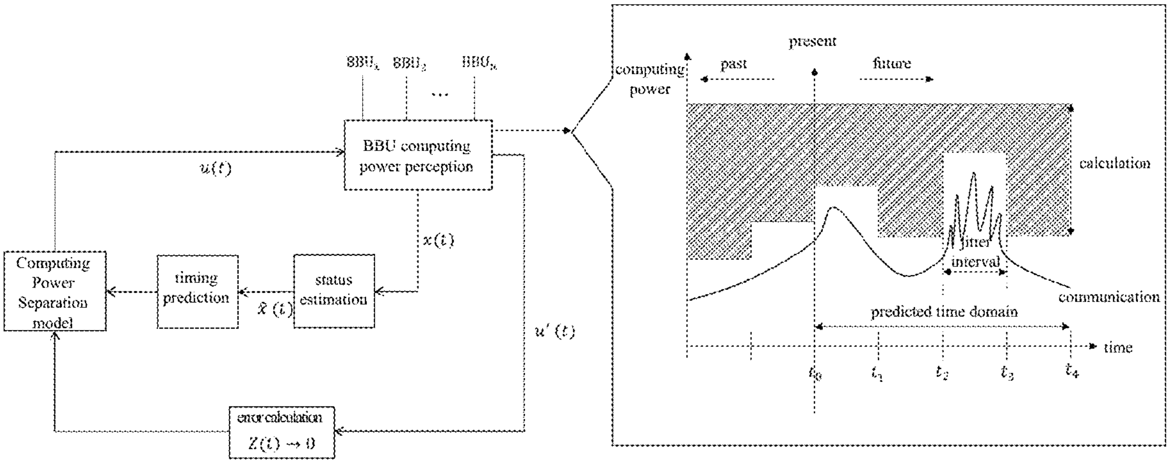
FIG. 7 is a schematic flowchart of a computing power prediction method according to an embodiment of the present disclosure.

FIG. 7 is a schematic flowchart of a computing power prediction method according to an embodiment of the present disclosure. As shown in FIG. 7, the MEC collects the use amount $x_i(t)$ of computing power resource for communication services of $BBU_i$ at the time t, the status $\widetilde{x_i}(t)$ of computing power resource for communication services is obtained by the status estimation algorithm. The current status and the historical status of computing power resource for communication services of $BBU_i$ at the current time t are processed by the timing prediction algorithm to obtain the first predicted use amount of computing power resource for communication services $\widetilde{x_i}_t^{(t+\tau)}$ in the preset time domain [t, t+τ]. The predicted idle computing power $u_i(t)$ of $BBU_i$ at the time t is obtained based on the computing power separation model, the error $$z(t) = \sum_{t=t_0}^{t_k} (u_i(t) - u_i'(t))^2$$

is calculated based on the actual idle computing power $$u_i'(t)$$

at the time t to perform the feedback modification on the scaling-out threshold β, with the target of $z(t) \rightarrow 0$ until the error is minimum and an optimal scaling-out threshold is obtained.

The idle computing power in the preset time domain is predicted by the computing power separation model based on the optimal scaling-out threshold. Through the perception of the computing power resource, that is, the prediction of the future available idle computing power resource, the future changing trend is predicted based on the historical available idle computing power resource. The common trends include: a long-term trend, a seasonal change, a cyclical fluctuation, an irregular fluctuation and the like.

It can be seen from the right block diagram in FIG. 7 that the predicted idle computing power for calculation shows a step-like change with time, and the actual use amount of computing power for communication services in the jitter interval does not exceed the predicted computing power for communication services (that is, a perpendicular distance between a transverse line and a horizontal coordinate in the jitter interval), so that the calculated predicted idle computing power can be always available, the situation that the actual computing power resources are insufficient due to the high predicted idle computing power is avoided, and strong robustness is achieved in the scenarios of the periodic change and burr (sudden fluctuation) of the computing power resources.

Figure 8:
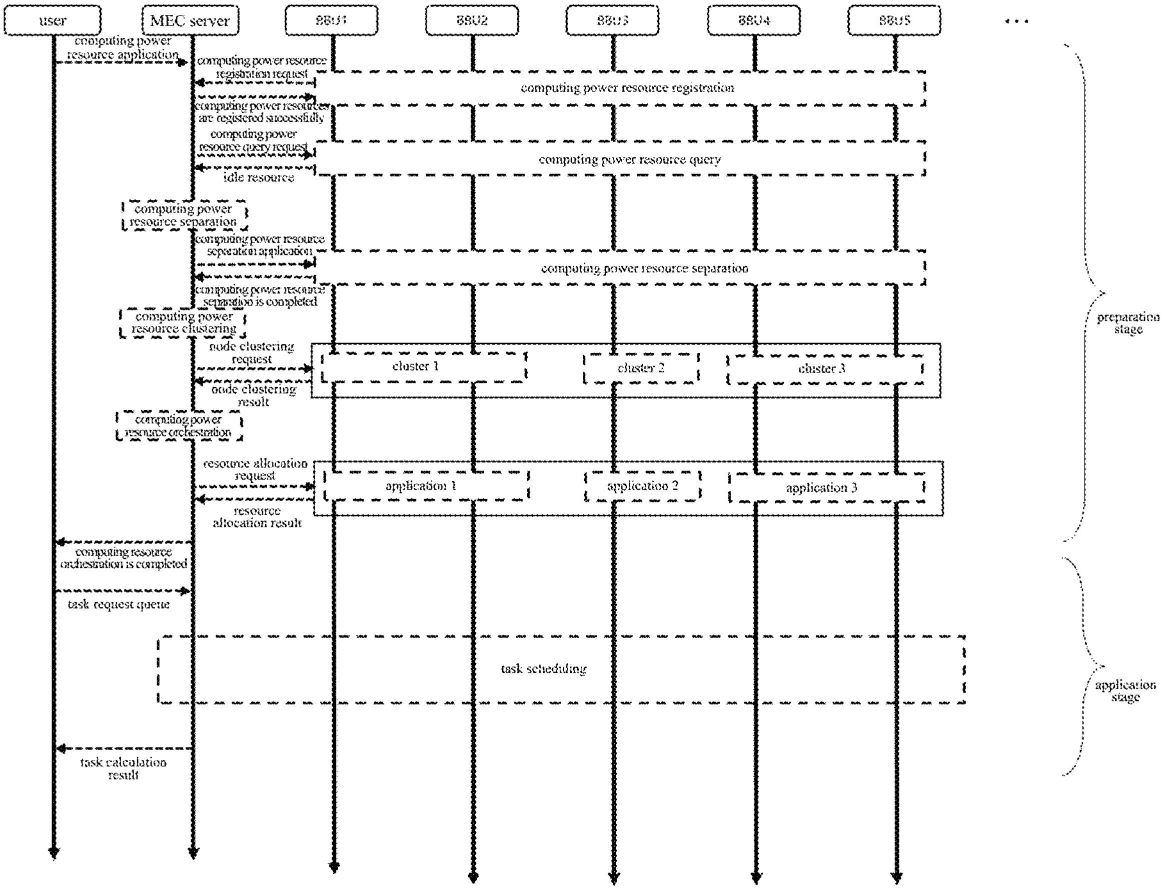
FIG. 8 is a schematic flowchart of a computing power resource orchestration and task scheduling process according to an embodiment of the present disclosure.

As an optional embodiment, FIG. 8 is a schematic flowchart of a computing power resource orchestration and task scheduling process according to an embodiment of the present disclosure. As shown in FIG. 8, the computing power resource orchestration and application process is divided into two stages: a preparation stage and an application stage, specifically including:

after a user applies a computing power resource to the MEC server, each BBU initiates a registration request of incorporating computing power into management, and the MEC completes the registration of BBU incorporating computing power into management and responds with a success message.

The MEC initiates a computing power resource query request to the successfully registered BBU, and each BBU transmits the current and historical idle computing power resource statuses to the MEC.

For each BBU, the MEC performs future idle computing power resource prediction on the current and historical idle computing power resource statuses, and performs computing power resource separation on each BBU according to the prediction result.

After the MEC applies for computing power resource separation to each BBU, the BBU separates the BBU idle resource by a hypervisor technology and informs the MEC through a message, and the MEC automatically incorporates the BBU idle computing power into management for subsequent use by applications.

The MEC clusters BBU nodes incorporated into management into a cluster. Each cluster will obtain the application orchestration result adapted to each cluster computing power resource according to the computing power requirements of different applications. The cluster will obtain the task scheduling result adapted to each cluster according to the computing power requirement of the tasks.

The specific implementation process of each step may be referenced to the description of the corresponding embodiments above, and details are not repeated here.

In the embodiments of the present disclosure, the capability of an existing computing power network is enhanced by the idle computing power in the network device on the premise of not changing the basic function and architecture of the network, thereby providing more flexible and low-cost computing power supply for a computing application. Compared with an existing scheme, the network device in a computing native network (CNN) can have communication and calculation capabilities without adding an additional computing power hardware device, and has the advantages of ultralow time delay, ultrahigh reliability, ultrahigh safety and performance price ratio.

As an optional embodiment, the target application includes a Federated Learning application; and a corresponding initial local model is respectively deployed by each BBU in the second cluster; and the second cluster performs a task, including:

performing at least one training operation on an initial aggregation model in the MEC server until a training ending condition is met, and taking the initial aggregation model meeting the training ending condition as a trained aggregation model, The training operation includes:

acquiring the initial local model deployed for each BBU in the second cluster;

performing model aggregation on a plurality of initial local models to obtain a first aggregation model, and updating the initial aggregation model based on the first aggregation model; and in a case that a loss function of the updated initial aggregation model does not meet the training ending condition, sending the updated initial aggregation model to each BBU in the second cluster respectively so that each BBU takes the updated initial aggregation model as an initial local model for a next training operation.

Specifically, the training or inference of the Federated Learning (FL) model may be calculated by the idle computing power of the plurality of BBUs in the computing power network. The FL is a method for method for performing machine learning in a distributed environment, and allows a plurality of devices or entities to jointly train or infer a model without transmitting original data to a centralized server, so that data privacy can be protected.

At least one first cluster matched with a Federated Learning application may be allocated for the Federated Learning application through computing power resource orchestration, and a second cluster corresponding to the Federated Learning task may be determined from the at least one first cluster through task scheduling. The computing power resource orchestration process and the task scheduling process of the Federated Learning application may be referenced to the above, which will not be repeated herein.

The embodiments of the present disclosure take the training task of the Federated Learning model as an example for detailed description. To perform the training task of the Federated Learning model, a corresponding initial local model may be deployed on each BBU in the second cluster. The process of performing the Federated Learning model training task by the second cluster may include:

determining an initial aggregation model in the MEC server, and performing the training operation on the initial aggregation model repeatedly until a preset training ending condition is met.

The training operation includes:

uploading, by each BBU in the second cluster, the corresponding initial local model to the MEC server; obtaining, by the MEC server, the plurality of initial local models, aggregating the plurality of initial local models to acquire a first aggregation model, replacing the initial aggregation model with the first aggregation model, determining the loss function of the updated initial aggregation model; in case that the loss function of the updated initial aggregation model does not meet the training ending condition, e.g., the loss function of the updated initial aggregation model is not less than the preset threshold, sending, by the MEC server, the updated initial aggregation model (i.e., the first aggregation model) to each BBU in the second cluster respectively. For each BBU, each BBU may update the initial local model based on the updated initial aggregation model, that is, the aggregated first aggregation model is taken as a new initial aggregation model for the next training operation.

The above training operation is performed continuously until the loss function of the updated initial aggregation model meets the training ending condition, that is, the loss function is less than the preset threshold, the initial aggregation model meeting the training ending condition is taken as the trained aggregation model; meanwhile, for each BBU, the initial local model when the training ends is taken as the trained local model.

It should be noted that those skilled in the art may know that the method provided by the embodiments of the present disclosure may be suitable for the training and inference of the Federated Learning model, and may also be suitable for the training and inference of other distributed machine learning models.

In the embodiments of the present disclosure, the Federated Learning application is processed by the idle computing power of the plurality of BBUs in the computing power network, thereby ensuring that local data is not propagated externally, multi-party combined model training and inference meeting the data privacy protection requirement is realized, and "separated data island" is broken.

Figure 9:
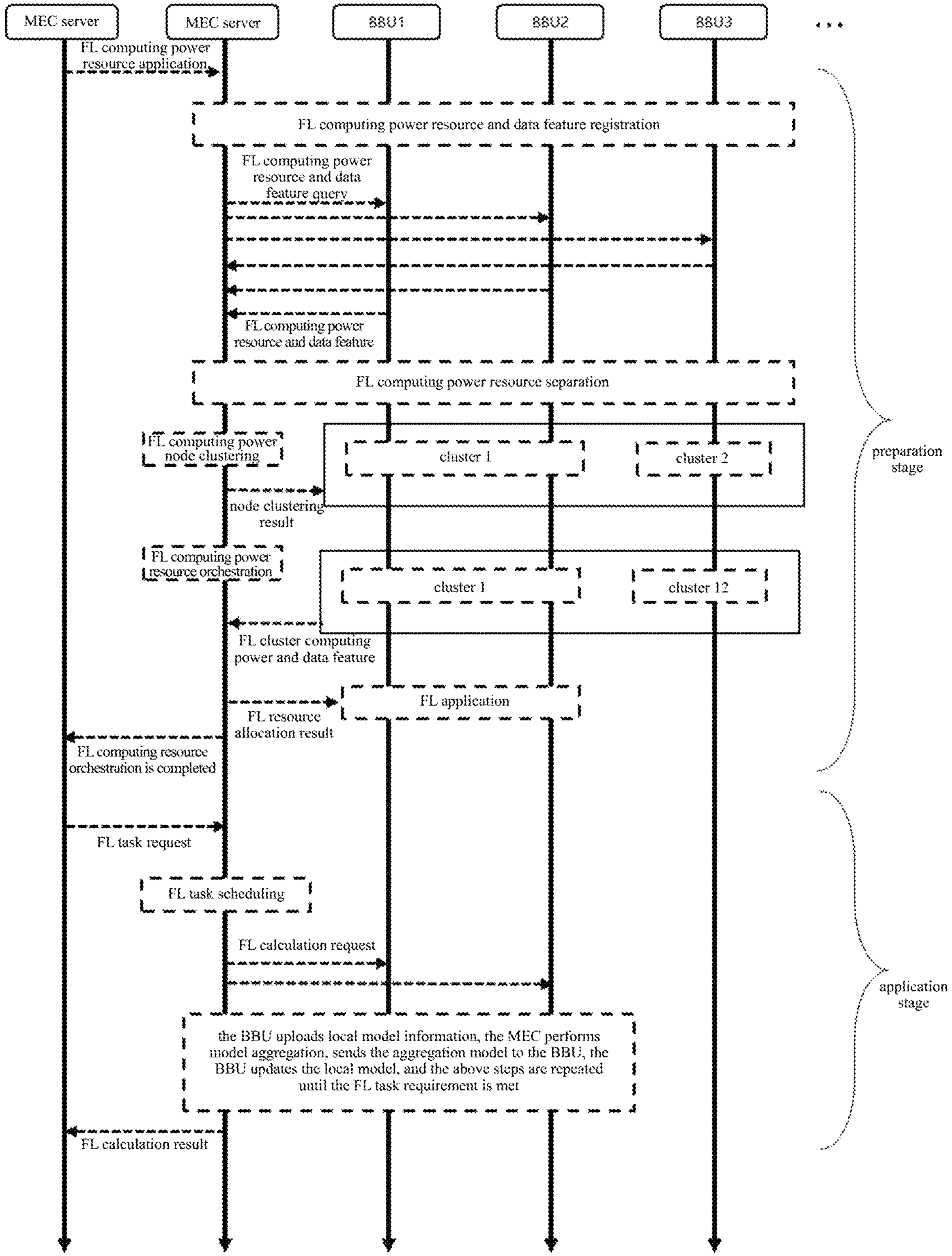
FIG. 9 is a schematic flowchart of a computing power resource orchestration and task scheduling process of a Federated Learning application according to an embodiment of the present disclosure.
Figure 10:
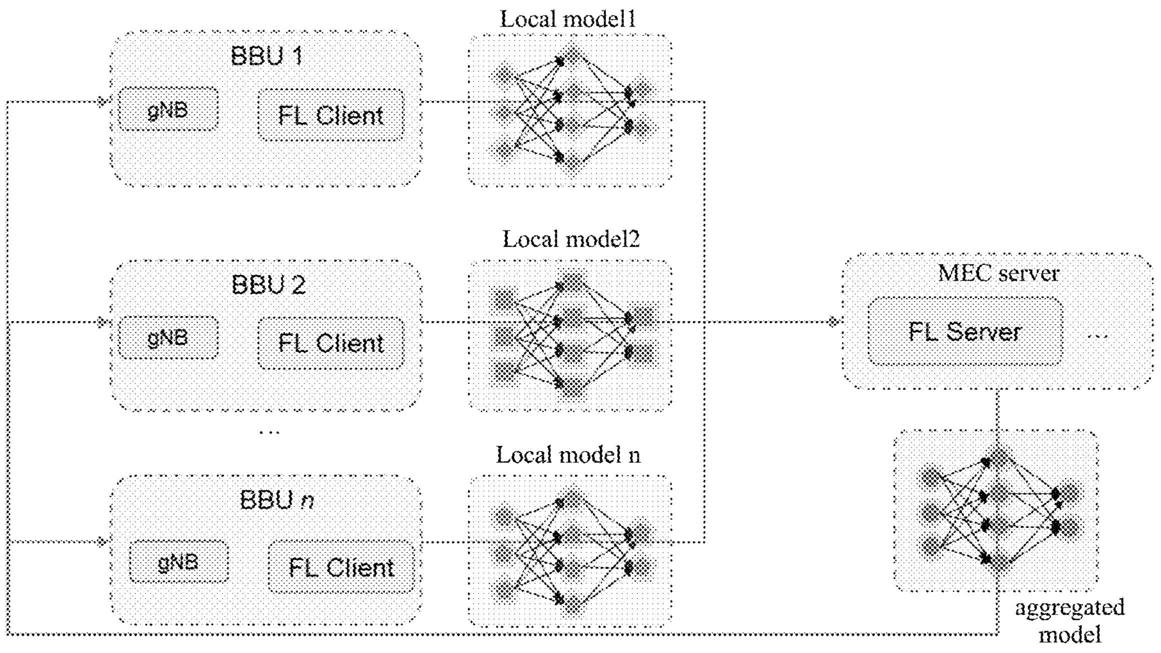
FIG. 10 is a system architecture diagram of computing native of a Federated Learning application according to an embodiment of the present disclosure.

As an optional embodiment, FIG. 9 is a schematic flowchart of a computing power resource orchestration and task scheduling process of a Federated Learning application according to an embodiment of the present disclosure. As shown in FIG. 9, the specific process includes:

deploying an FL server and a client on an MEC node and a selected BBU cluster, thereby improving the computing native FL service. FIG. 10 is a system architecture diagram of computing native of a Federated Learning application according to an embodiment of the present disclosure. As shown in FIG. 10, an FL client is deployed on each BBU, and an FL server is deployed on the MEC server.

When a user sends an FL service request to the MEC server, each BBU initiates a registration request of incorporating computing power and data feature into management, the MEC completes the registration of BBU incorporated into management and responds with a success message. The MEC initiates a computing power resource and data feature query request to the successfully registered BBU, and each BBU sends the current and historical idle computing power resources and the data feature statuses to the MEC. For each BBU, the MEC performs idle computing power resource prediction in the FL task execution time to for the current and historical idle computing power resource statuses, and performs computing power resource separation on BBUs according to the prediction result.

After the MEC applies for computing power resource separation to each BBU, the BBU separates the BBU idle resource by a hypervisor technology and informs the MEC through a message, and the MEC automatically incorporates the BBU idle computing power into management for subsequent use by applications. The MEC clusters the BBU nodes incorporated into management into a cluster 1 and a cluster 2. Each computing power cluster uploads the computing power resource and the data feature to the MEC, and the MEC allocates the FL application to the cluster 1 through FL computing power resource orchestration.

After the MEC server establishes a scheduling model for the FL task and the cluster 1 and determines a scheduling policy, the cluster 1 is selected in combination with an FIFO scheduling algorithm, the FL task is performed, the time $t'_j$ of the FL task running on the cluster j is calculated, $t'_{max}=\max\{wt'_j\}$ is the evaluation of the scheduling scheme, the optimizing target is to meet $t'_{max}<t_0$, $t_0$ is a specified optimizing target, and an optimal scheduling scheme is finally obtained.

When a model training task is performed, the BBU in the cluster 1 uploads local model information, the MEC performs model aggregation, the aggregation model is sent to the BBU, the BBU updates the local model, and the above steps are repeated until the FL task requirement is met, for example, the loss function is less than the preset threshold, and finally, the MEC returns the calculation result to the user.

In the embodiments of the present disclosure, the native computing is combined with the FL learning to design a computing native system architecture based on the FL learning, and the model training or inference of the FL is performed through the coordination of the idle computing power resource of each BBU, so that the utilization rate of the computing power resources is increased, and an efficient computing service is provided.

Figure 11:
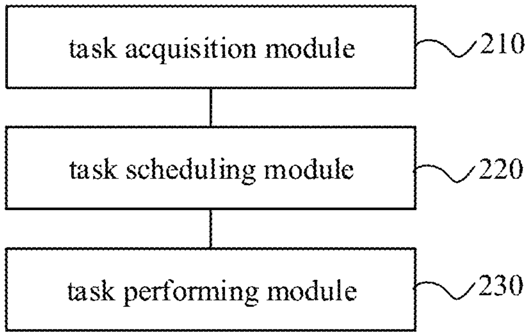
FIG. 11 is a schematic structural diagram of an artificial intelligence-based data processing apparatus according to an embodiment of the present disclosure.

FIG. 11 is a schematic structural diagram of an artificial intelligence-based data processing apparatus according to an embodiment of the present disclosure. As shown in FIG. 11, the apparatus includes:

a task acquisition module 210, configured to, in response to at least one task request for a target application, acquire at least one task respectively corresponding to the at least one task request;

a task scheduling module 220, configured to determine a second cluster respectively corresponding to each task from at least one first cluster corresponding to the target application, based on task information respectively corresponding to each task, wherein the second cluster is a cluster matched with task information of the task;

a task performing module 230, configured to, for each task, allocate the task to the second cluster corresponding to the task so that the second cluster performs the task based on a calculation computing power resource, wherein the first clusters are determined based on the following operations:

acquiring predicted idle computing power respectively corresponding to at least one base band unit (BBU) during task execution time, and determining the calculation computing power resource corresponding to the predicted idle computing power from candidate computing power resources;

clustering each BBU based on predicted idle computing power respectively corresponding to each BBU to obtain at least one cluster;

acquiring at least one application to be processed, wherein the at least one application includes the target application; and determining at least one first cluster respectively corresponding to each application from the at least one cluster, based on a computing power requirement respectively corresponding to each application, wherein the first clusters are clusters matched with the computing power requirement of the application.

As an optional embodiment, the apparatus further includes a first cluster determining module, configured for:

determining the computing power requirement respectively corresponding to each application and a cluster feature respectively corresponding to each cluster, wherein the cluster feature is used to represent the computing power resource supply level of the cluster;

determining a first mapping relationship between each application and each cluster, based on the computing power requirement respectively corresponding to each application and the cluster feature respectively corresponding to each cluster; and determining at least one first cluster respectively corresponding to each application based on the first mapping relationship.

As an optional embodiment, when determining a first mapping relationship between each application and each cluster based on the computing power requirement respectively corresponding to each application and the cluster feature respectively corresponding to each cluster, the first cluster determining module is specifically configured for:

inputting the computing power requirement respectively corresponding to each application and the cluster feature respectively corresponding to each cluster to an orchestration model to obtain a plurality of candidate orchestration policies output by the orchestration model;

determining a target orchestration policy from the plurality of candidate orchestration policies based on a first policy evaluation index; and determining the first mapping relationship based on the target orchestration policy.

As an optional embodiment, the task scheduling module is specifically configured for:

inputting the task information respectively corresponding to each task and each of the first clusters to a scheduling model to obtain a plurality of candidate scheduling policies output by the scheduling model;

determining a target scheduling policy from the plurality of candidate scheduling policies based on a second policy evaluation index; and determining the second cluster respectively corresponding to each task based on the target scheduling policy.

As an optional embodiment, the apparatus further includes a computing power prediction module, configured to:

acquire predicted idle computing power respectively corresponding to at least one base band unit (BBU) during task execution time.

The computing power prediction module is specifically configured for:

for each BBU, acquiring a predicted use amount of computing power resource for communication services of the BBU during the task execution time; and determining the predicted idle computing power of the BBU during the task execution time, based on the predicted use amount of computing power resource for communication services of the BBU, a resource constraint corresponding to the BBU and a scaling-out threshold.

As an optional embodiment, the apparatus further includes a scaling-out threshold determining module, configured for:

determining an initial scaling-out threshold; and performing at least one optimizing operation on the initial scaling-out threshold until a preset ending condition is met, and taking the initial scaling-out threshold meeting the preset ending condition as the scaling-out threshold, wherein the optimizing operations include:

for each BBU, acquiring a current status information of computing power resource for communication services and a historical status information of computing power resource for communication services of the BBU;

determining a first predicted use amount of computing power resource for communication services in a preset time domain, based on the current status information of computing power resource for communication services and the historical status information of computing power resource for communication services;

for any preset time in the preset time domain, determining a second predicted use amount of computing power resource for communication services at the preset time from the first predicted use amount of computing power resource for communication services;

obtaining predicted idle computing power of the BBU at the preset time, based on the second predicted use amount of computing power resource for communication services, the resource constraint corresponding to the BBU and the initial scaling-out threshold;

determining a predicted error, based on a difference between predicted idle computing power at each preset time and actual idle computing power at each preset time in the preset time domain; and in a case that the predicted error does not meet the preset ending condition, modifying the initial scaling-out threshold and taking the modified initial scaling-out threshold as an initial scaling-out threshold for a next optimization.

As an optional embodiment, the target application includes a Federated Learning application; and a corresponding initial local model is respectively deployed by each BBU in the second cluster; and the second cluster in the task performing module performs the task, for:

performing at least one training operation on an initial aggregation model in the MEC server until a training ending condition is met, and taking the initial aggregation model meeting the training ending condition as a trained aggregation model, wherein the training operations include:

acquiring the initial local model deployed by each BBU in the second cluster;

performing model aggregation on a plurality of initial local models to obtain a first aggregation model, and updating the initial aggregation model based on the first aggregation model; and in a case that a loss function of the updated initial aggregation model does not meet the training ending condition, sending the updated initial aggregation model to each BBU in the second cluster respectively so that each BBU takes the updated initial aggregation model as an initial local model for a next training operation.

The apparatus provided by the embodiments of the present disclosure may perform the method provided by the embodiments of the present disclosure, and the implementation principle is similar. The action performed by each module in the apparatus provided by the embodiments of the present disclosure corresponds to the steps in the method provided by each embodiment of the present disclosure. The detailed functional description of each module of the apparatus may be referenced to the description of the corresponding method mentioned above, which will not be repeated herein.

The embodiments of the present disclosure provide an electronic device, including a memory, a processor and computer programs stored in the memory. The processor executes the computer programs to implement the steps of the artificial intelligence-based data processing method. Compared with the prior art, through embodiments of the present disclosure, in an application deployment stage, the predicted idle computing power respectively corresponding to at least one BBU during task execution time is obtained, each BBU is clustered based on the corresponding predicted idle computing power of each BBU to obtain at least one cluster, and at least one first cluster respectively corresponding to each application is determined based on the computing power requirement respectively corresponding to each application, so that each application is allocated to a cluster which is matched with computing power requirement, idle computing power for the network device in the computing power network is utilized sufficiently, reasonable allocation of idle computing power in the computing power network is achieved, and the utilization of the computing power resources in computing power network is improved. In a task execution stage, by acquiring at least one task of a target application, a second cluster matched with task information of each task is determined from the at least one first cluster based on the task information respectively corresponding to each task, so that the second cluster performs the task based on the calculation computing power resource, an additional hardware device is not required, and computing power support is provided for the computing application by decoupling the idle computing power of a large number of BBUs from the communication service, and flexible and low-cost computing power supply is realized. Further, the second cluster matched with the task information of each task is determined based on the task information respectively corresponding to each task, so that different tasks can be allocated reasonably between clusters, the computing efficiency of each task is improved, and efficient computing service can be provided.

Figure 12:
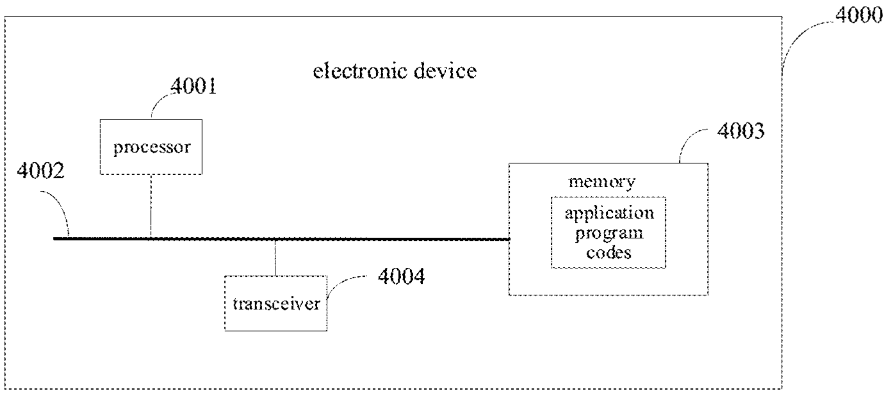
FIG. 12 is a schematic structural diagram of an electronic device according to an embodiment of the present disclosure.

In an optional embodiment, an electronic device is provided. As shown in FIG. 12, the electronic device 4000 shown in FIG. 12 includes: a processor 4001 and a memory 4003. The processor 4001 and the memory 4003 are connected, for example, through a bus 4002. Optionally, the electronic device 4000 may further include a transceiver 4004. The transceiver 4004 may be used for the data interaction between the electronic device and other electronic devices, for example, data transmission and/or data reception. It should be noted that in actual application, the number of the transceivers 4004 is not limited to one, and the structure of the electronic device 4000 does not limit the embodiments of the present disclosure.

The processor 4001 may be a central process unit (CPU), a digital signal processor (DSP), an application specific integrated circuit (ASIC), a field programmable gate array (FPGA), or another programmable logic device, a transistor logic device, a hardware component, or any combination thereof. The processing unit may implement or execute various illustrative logical blocks, modules, and circuits described in combination with contents disclosed in the present disclosure. The processor 4001 may also be a combination for realizing calculation functions, for example, the processor 401 may include one or more microprocessor combinations, a combination of a DSP and a microprocessor and the like.

A bus 4002 may include a pathway for transmitting information between the above components. The bus 4002 may be a peripheral component interconnect (PCI) bus or an extended industry standard architecture (EISA) bus and the like. The bus 4002 may be divided into an address bus, a data bus, and a control bus, etc. For ease of representation, only one thick line is shown in FIG. 12, but it does not indicate that there is only one bus or one type of bus.

The memory 4003 may be a read only memory (ROM) or other types of static storage devices that may store static information and instructions, a random access memory (RAM) or other type of dynamic storage device that may store information and instructions, or may be an electrically erasable programmable read only memory (EEPROM), a compact disc read only memory (CD-ROM) or other optical disk storage, optical disk storage (including compact disk, laser disk, optical disk, digital versatile disk, Blu-ray disk and the like), magnetic disk storage media or other magnetic storage devices, or any other medium that can be used to carry or store desired program code in the form of instructions or data structures and that can be accessed by a computer, but is not limited thereto.

The memory 4003 is configured to store computer programs for executing the embodiments of the present disclosure, and the execution is controlled by the processor 4001. The processor 4001 is configured to execute computer programs stored in the memory 4003 to implement the steps shown in the foregoing method embodiments.

Embodiments of the present disclosure provide a computer-readable storage medium. The computer-readable storage medium stores computer programs. When the computer program are executed by a processor, the steps of the method embodiment and the corresponding content may be implemented.

The terms "first", "second", "third", "fourth", "1st", "2nd" and the like (in a case that they are present) in the specification, the claims and the drawings of the present disclosure are used to distinguish between similar objects and not necessarily to describe a specific sequence or order. It should be understood that such used data is interchangeable under appropriate circumstances, such that the embodiments of the present disclosure described herein can be implemented in a sequence other than those illustrated or described herein.

It should be understood that although the steps in the flowchart of the embodiments of the present disclosure are sequentially indicated by the arrows, these steps are not necessarily performed in the order indicated by the arrows. Unless explicitly stated in the present disclosure, the steps in each flowchart may be performed in other sequences according to requirements in some implementation scenarios of the embodiments of the preset disclosure. Moreover, some or all steps in each flowchart are based on the actual implementation scenarios, and may include a plurality of sub-steps or a plurality of stages. Part or all of the sub-steps or stages may be performed at the same time, and each sub-step or stage of these sub-steps or stages may also be performed respectively at different times. In scenarios with different execution times, the execution order of these sub-steps or stages may be flexibly configured according to requirements, which is not limited in the embodiments of the present disclosure.

The foregoing descriptions are merely some implementations of the present disclosure. It should be noted that, to a person of ordinary skill in the art, without departing from the technical concept of the solutions of the present disclosure, the use of other similar implementation means based on the technical concept of the present disclosure also belongs to the protection scope of the embodiments of the present disclosure.

What is claimed is:

1. An artificial intelligence-based data processing method applied to a Mobile Edge Computing (MEC) server, comprising:

in response to at least one task request for a target application, acquiring at least one task respectively corresponding to the at least one task request;

determining a second cluster respectively corresponding to each task from at least one first cluster corresponding to the target application, based on task information respectively corresponding to each task, wherein the second cluster is a cluster matched with task information of the task; and for each task, allocating the task to the second cluster corresponding to the task so that the second cluster performs the task based on a calculation computing power resource, wherein the first clusters are determined based on the following operations:

acquiring predicted idle computing power respectively corresponding to at least one base band unit (BBU) during task execution time, and determining the calculation computing power resource corresponding to the predicted idle computing power from candidate computing power resources;

clustering each BBU based on predicted idle computing power respectively corresponding to each BBU to obtain at least one cluster;

acquiring at least one application to be processed, wherein the at least one application includes the target application; and determining at least one first cluster respectively corresponding to each application from the at least one cluster, based on a computing power requirement respectively corresponding to each application, wherein the first clusters are clusters matched with the computing power requirement of the application.

2. The data processing method according to claim 1, wherein the determining at least one first cluster respectively corresponding to each application from the at least one cluster, based on a computing power requirement respectively corresponding to each application comprises:

determining the computing power requirement respectively corresponding to each application and a cluster feature respectively corresponding to each cluster, wherein the cluster feature is used to represent the computing power resource supply level of the cluster;

determining a first mapping relationship between each application and each cluster, based on the computing power requirement respectively corresponding to each application and the cluster feature respectively corresponding to each cluster; and determining at least one first cluster respectively corresponding to each application based on the first mapping relationship.

3. The data processing method according to claim 2, wherein the determining a first mapping relationship between each application and each cluster, based on the computing power requirement respectively corresponding to each application and the cluster feature respectively corresponding to each cluster comprises:

inputting the computing power requirement respectively corresponding to each application and the cluster feature respectively corresponding to each cluster to an orchestration model to obtain a plurality of candidate orchestration policies output by the orchestration model;

determining a target orchestration policy from the plurality of candidate orchestration policies based on a first policy evaluation index; and determining the first mapping relationship based on the target orchestration policy.

4. The data processing method according to claim 1, wherein the determining a second cluster respectively corresponding to each task from at least one first cluster corresponding to the target application, based on task information respectively corresponding to each task comprises:

inputting the task information respectively corresponding to each task and each of the first clusters to a scheduling model to obtain a plurality of candidate scheduling policies output by the scheduling model;

determining a target scheduling policy from the plurality of candidate scheduling policies based on a second policy evaluation index; and determining the second cluster respectively corresponding to each task based on the target scheduling policy.

5. The data processing method according to claim 1, wherein the acquiring predicted idle computing power respectively corresponding to at least one base band unit (BBU) during task execution time comprises:

for each BBU, acquiring a predicted use amount of computing power resource for communication services of the BBU during the task execution time; and determining the predicted idle computing power of the BBU during the task execution time, based on the predicted use amount of computing power resource for communication services of the BBU, a resource constraint corresponding to the BBU and a scaling-out threshold.

6. The data processing method according to claim 5, wherein the scaling-out threshold is determined based on the following operations:

determining an initial scaling-out threshold; and performing at least one optimizing operation on the initial scaling-out threshold until a preset ending condition is met, and taking the initial scaling-out threshold meeting the preset ending condition as the scaling-out threshold, wherein the optimizing operations comprise:

for each BBU, acquiring a current status information of computing power resource for communication services and a historical status information of computing power resource for communication services of the BBU;

determining a first predicted use amount of computing power resource for communication services in a preset time domain, based on the current status information of computing power resource for communication services and the historical status information of computing power resource for communication services;

for any preset time in the preset time domain, determining a second predicted use amount of computing power resource for communication services at the preset time from the first predicted use amount of computing power resource for communication services;

obtaining predicted idle computing power of the BBU at the preset time, based on the second predicted use amount of computing power resource for communication services, the resource constraint corresponding to the BBU and the initial scaling-out threshold;

determining a predicted error, based on a difference between predicted idle computing power at each preset time and actual idle computing power at each preset time in the preset time domain; and in a case that the predicted error does not meet the preset ending condition, modifying the initial scaling-out threshold and taking the modified initial scaling-out threshold as an initial scaling-out threshold for a next optimization.

7. The data processing method according to claim 1, wherein the target application comprises a Federated Learning application; and a corresponding initial local model is respectively deployed by each BBU in the second cluster; and the second cluster performing a task, comprising:

performing at least one training operation on an initial aggregation model in the MEC server until a training ending condition is met, and taking the initial aggregation model meeting the training ending condition as a trained aggregation model, wherein the training operations comprise:

acquiring the initial local model deployed by each BBU in the second cluster;

performing model aggregation on a plurality of initial local models to obtain a first aggregation model, and updating the initial aggregation model based on the first aggregation model; and in a case that a loss function of the updated initial aggregation model does not meet the training ending condition, sending the updated initial aggregation model to each BBU in the second cluster respectively so that each BBU takes the updated initial aggregation model as an initial local model for a next training operation.

8. A non-transitory computer-readable storage medium having computer programs stored thereon, wherein the computer programs, when executed by a processor, implement the steps of the method according to claim 1.

9. An electronic device comprising a memory and a processor, the memory is configured to store computer programs which, when executed by the processor, is configured to the following operations:

in response to at least one task request for a target application, acquiring at least one task respectively corresponding to the at least one task request;

determining a second cluster respectively corresponding to each task from at least one first cluster corresponding to the target application, based on task information respectively corresponding to each task, wherein the second cluster is a cluster matched with task information of the task; and for each task, allocating the task to the second cluster corresponding to the task so that the second cluster performs the task based on a calculation computing power resource, wherein the first clusters are determined based on the following operations:

acquiring predicted idle computing power respectively corresponding to at least one base band unit (BBU) during task execution time, and determining the calculation computing power resource corresponding to the predicted idle computing power from candidate computing power resources;

clustering each BBU based on predicted idle computing power respectively corresponding to each BBU to obtain at least one cluster;

acquiring at least one application to be processed, wherein the at least one application includes the target application; and determining at least one first cluster respectively corresponding to each application from the at least one cluster, based on a computing power requirement respectively corresponding to each application, wherein the first clusters are clusters matched with the computing power requirement of the application.

10. The electronic device according to claim 9, wherein the determining at least one first cluster respectively corresponding to each application from the at least one cluster, based on a computing power requirement respectively corresponding to each application comprises:

determining the computing power requirement respectively corresponding to each application and a cluster feature respectively corresponding to each cluster, wherein the cluster feature is used to represent the computing power resource supply level of the cluster;

determining a first mapping relationship between each application and each cluster, based on the computing power requirement respectively corresponding to each application and the cluster feature respectively corresponding to each cluster; and determining at least one first cluster respectively corresponding to each application based on the first mapping relationship.

11. The electronic device according to claim 10, wherein the determining a first mapping relationship between each application and each cluster, based on the computing power requirement respectively corresponding to each application and the cluster feature respectively corresponding to each cluster comprises:

inputting the computing power requirement respectively corresponding to each application and the cluster feature respectively corresponding to each cluster to an orchestration model to obtain a plurality of candidate orchestration policies output by the orchestration model;

determining a target orchestration policy from the plurality of candidate orchestration policies based on a first policy evaluation index; and determining the first mapping relationship based on the target orchestration policy.

12. The electronic device according to claim 9, when the determining a second cluster respectively corresponding to each task from at least one first cluster corresponding to the target application, based on task information respectively corresponding to each task comprises:

inputting the task information respectively corresponding to each task and each of the first clusters to a scheduling model to obtain a plurality of candidate scheduling policies output by the scheduling model;

determining a target scheduling policy from the plurality of candidate scheduling policies based on a second policy evaluation index; and determining the second cluster respectively corresponding to each task based on the target scheduling policy.

13. The electronic device according to claim 9, wherein the acquiring predicted idle computing power respectively corresponding to at least one base band unit (BBU) during task execution time comprises:

for each BBU, acquiring a predicted use amount of computing power resource for communication services of the BBU during the task execution time; and determining the predicted idle computing power of the BBU during the task execution time, based on the predicted use amount of computing power resource for communication services of the BBU, a resource constraint corresponding to the BBU and a scaling-out threshold.

14. The electronic device according to claim 13, wherein the scaling-out threshold is determined based on the following operations:

determining an initial scaling-out threshold; and performing at least one optimizing operation on the initial scaling-out threshold until a preset ending condition is met, and taking the initial scaling-out threshold meeting the preset ending condition as the scaling-out threshold, wherein the optimizing operations comprise:

for each BBU, acquiring a current status information of computing power resource for communication services and a historical status information of computing power resource for communication services of the BBU;

determining a first predicted use amount of computing power resource for communication services in a preset time domain, based on the current status information of computing power resource for communication services and the historical status information of computing power resource for communication services;

for any preset time in the preset time domain, determining a second predicted use amount of computing power resource for communication services at the preset time from the first predicted use amount of computing power resource for communication services;

obtaining predicted idle computing power of the BBU at the preset time, based on the second predicted use amount of computing power resource for communication services, the resource constraint corresponding to the BBU and the initial scaling-out threshold;

determining a predicted error, based on a difference between predicted idle computing power at each preset time and actual idle computing power at each preset time in the preset time domain; and in a case that the predicted error does not meet the preset ending condition, modifying the initial scaling-out threshold and taking the modified initial scaling-out threshold as an initial scaling-out threshold for a next optimization.

15. The electronic device according to claim 9, wherein the target application comprises a Federated Learning application; and a corresponding initial local model is respectively deployed by each BBU in the second cluster; and the second cluster performing a task, comprising:

performing at least one training operation on an initial aggregation model in the MEC server until a training ending condition is met, and taking the initial aggregation model meeting the training ending condition as a trained aggregation model, wherein the training operations comprise:

acquiring the initial local model deployed by each BBU in the second cluster;

performing model aggregation on a plurality of initial local models to obtain a first aggregation model, and updating the initial aggregation model based on the first aggregation model; and in a case that a loss function of the updated initial aggregation model does not meet the training ending condition, sending the updated initial aggregation model to each BBU in the second cluster respectively so that each BBU takes the updated initial aggregation model as an initial local model for a next training operation.

* * * * *